United States Patent
Zhou et al.

(10) Patent No.: US 9,966,853 B2
(45) Date of Patent: May 8, 2018

(54) METHOD AND APPARATUS FOR MULTI-PHASE DC-DC CONVERTERS USING COUPLED INDUCTORS IN DISCONTINUOUS CONDUCTION MODE

(71) Applicant: Maxim Integrated Products, Inc., San Jose, CA (US)

(72) Inventors: Xin Zhou, Nashua, NH (US); Justin Michael Burkhart, Bolton, MA (US); Brett A. Miwa, Wellesley, MA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days. days.

(21) Appl. No.: 15/283,915

(22) Filed: Oct. 3, 2016

(65) Prior Publication Data

US 2017/0098998 A1 Apr. 6, 2017

Related U.S. Application Data

(60) Provisional application No. 62/237,318, filed on Oct. 5, 2015.

(51) Int. Cl.
*H02M 3/158* (2006.01)
*H02M 1/00* (2006.01)

(52) U.S. Cl.
CPC .. *H02M 3/1584* (2013.01); *H02M 2001/0064* (2013.01)

(58) Field of Classification Search
CPC .... H02M 3/155; H02M 3/158; H02M 3/1584; H02M 2003/155; H02M 2003/158; H02M 2003/1584; H02M 2001/0064
See application file for complete search history.

(56) References Cited

U.S. PATENT DOCUMENTS

| | | | |
|---|---|---|---|
| 7,317,305 B1 | 1/2008 | Stratakos et al. | |
| 8,378,633 B2* | 2/2013 | Bartling | H02M 1/15 320/128 |
| 8,885,366 B2* | 11/2014 | Yu | H02M 3/33576 363/24 |
| 2007/0109822 A1* | 5/2007 | Kuan | H02M 3/1588 363/21.14 |
| 2014/0049231 A1* | 2/2014 | Takata | H02M 1/4225 323/207 |
| 2016/0056709 A1* | 2/2016 | Khayat | H02M 3/1588 323/223 |

* cited by examiner

*Primary Examiner* — Matthew Nguyen

(57) ABSTRACT

The present disclosure eliminates the unwanted conduction of the body diode of the low side switch or the unwanted conduction of the low side switch in coupled phases of DC-DC converters operating in DCM to increase efficiency. Specifically, in one implementation, by detecting strong or weak coupling, the present disclosure eliminates body diode conduction in strong coupling by turning on the low side switch and eliminates negative body diode current in weak coupling by turning off the low side switch. Further, for multiphase switching DC-DC converters with coupled inductors operating at light load (i.e., in DCM), when a high side switch of a first phase is turned on, the body diode of a low side switch of a second phase is adaptively bypassed if needed, blocked by specific design, or prevented from conducting by reducing forward voltage across the body diode.

25 Claims, 20 Drawing Sheets

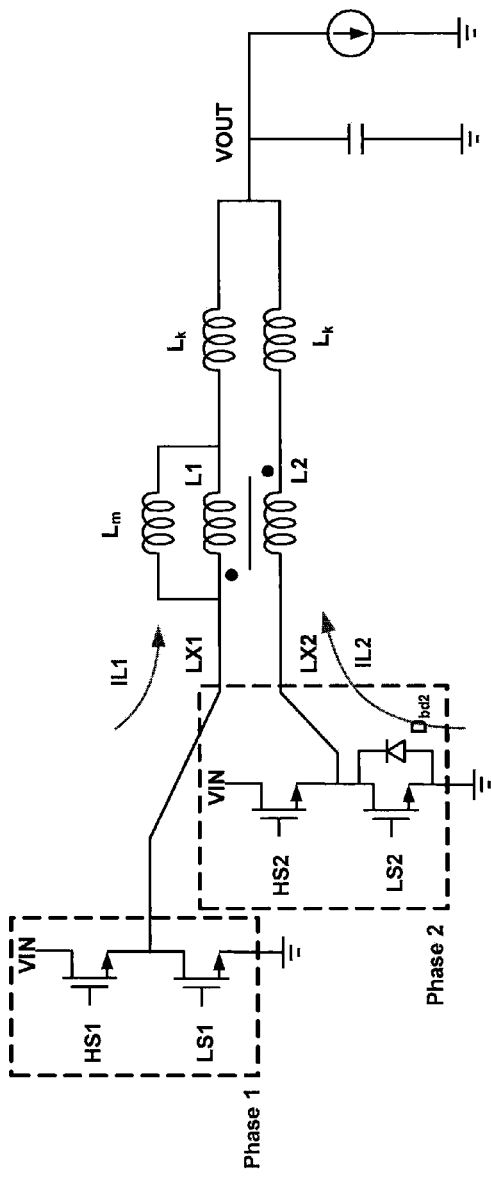
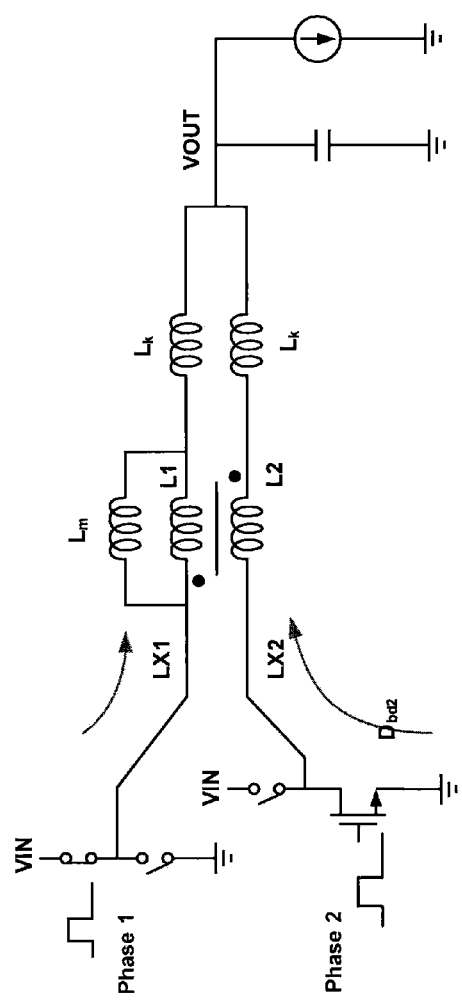
FIG. 3
FIG. 4

METHOD AND APPARATUS FOR MULTI-PHASE DC-DC CONVERTERS USING COUPLED INDUCTORS IN DISCONTINUOUS CONDUCTION MODE

CROSS-REFERENCE TO RELATED APPLICATIONS

This application claims the benefit of U.S. Provisional Application No. 62/237,318, filed on Oct. 5, 2015. The entire disclosure of the application referenced above is incorporated herein by reference.

FIELD

The present disclosure relates generally to switching power supplies and more particularly to improving light load power efficiency of multiphase switching converters using coupled inductors in discontinuous conduction mode.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A multiphase coupled-inductor DC-DC converter operates in continuous conduction mode (CCM) when the output power demand is high and in discontinuous conduction mode (DCM) when the output power demand is low. Most DC-DC converters that deliver high current operate in CCM, where high and low side switches of the DC-DC converter switch on and off alternately, and current in a coupled inductor of the DC-DC converter ramps up and down continuously. CCM enables the DC-DC converter to deliver high current with high efficiency.

In DCM, the DC-DC converter delivers energy to the load only when needed. When energy is needed, a high side switch turns on for certain amount of time. After the high side switch turns off, a low side switch turns on. As inductor current drops to zero, the low side switch turns-off. When energy is not needed, the switches of the DC-DC converter stop switching and remain off until energy is needed. When the switches are off, the inductor current remains zero; and an output filter capacitor supports the current when both switches are off. Accordingly, in DCM, the switching loss and the AC current related loss scale down with decreasing load current, and the DC-DC converter maintains high efficiency even at light load.

SUMMARY

A multiphase DC-DC converter comprises a coupled inductor that includes first and second inductors coupled together, a first phase including first high side and low side switches connected to the first inductor, a second phase including second high side and low side switches connected to the second inductor, and a controller that drives the first and second high side switches and the first and second low side switches to operate the DC-DC converter in discontinuous conduction mode. Throughout the present disclosure, first and second phases are used for example only, and the teachings of the present disclosure apply to multi-phase converters comprising more than two phases. Similarly, while the examples described include buck (step-down) converters operating with positive output current, the teachings of the present disclosure apply equally to buck converters with negative output current or high side body diode conduction, as well as to boost converters, buck-boost converters, and other topologies where coupled inductors are applicable. The controller determines, in response to the first high side switch being turned on and the second low side switch being turned off, that coupling between the first inductor and the second inductor is strong or weak based on whether a body diode of the second low side switch conducts or does not conduct. Strong or weak coupling can also be detected based on when a first phase high side switch turns on and a second phase low side switch is on, and inductor current in a second phase low side switch has positive polarity or negative polarity. The controller performs the following functions depending on whether the coupling is strong or weak If the coupling is strong, if high side switch of a first phase is on and low side switch of a second phase is off, turn on low side switch of the second phase; if low side switch of the second phase is on, keep it on. If the coupling is weak, if high side switch of a first phase is on and low side switch of a second phase is off, do not turn on low side switch of a second phase; If high side switch of a first phase is on and low side switch of a second phase is on, keep low side switch of the second phase on. This operation extends to all cases disclosed below where coupling between phases is an issue.

In another feature, a multiphase DC-DC converter comprises a coupled inductor that includes first and second inductors coupled together, a first phase including first high side and low side switches connected to the first inductor, and a second phase including second high side and low side switches connected to the second inductor. A third switch is connected between the first high side and low switches, where body diodes of the third switch and the first low side switch are connected back-to-back. A fourth switch is connected between the second high side and low switches, where body diodes of the fourth switch and the second low side switch are connected back-to-back. A controller drives the first and second high side switches and the first and second low side switches to operate the DC-DC converter in discontinuous conduction mode. The controller turns on the fourth switch only in response to the first high side switch being turned on, and turns on the third switch only in response to the second high side switch being turned on, where body diodes of first and second low side switches do not conduct. Further, the controller can detect whether coupling between the first and second phases is strong or weak, and if the coupling is weak, a third switch that is always on can be added in each phase to save switching power in weak coupling case.

In another feature, a multiphase DC-DC converter comprises a coupled inductor that includes first and second inductors coupled together, a first phase including first high side and low side switches connected to the first inductor, and a second phase including second high side and low side switches connected to the second inductor. A third switch is connected across bulk and drain terminals of the second low side switch. A fourth switch is connected across bulk and source terminals of the second low side switch. A controller drives the first and second high side switches and the first and second low side switches to operate the DC-DC converter in discontinuous conduction mode. The controller turns on the fourth switch in response to the first high side switch being turned on and a voltage at a junction of the second high side and low side switches having a first polarity. The controller turns on the third switch in response to the first high side switch being turned on and the voltage at the junction of the second high side and low side switches having a second polarity that is opposite to the first polarity. A body diode of the second low side switch does not conduct. Further, the controller can detect whether coupling between the first and second phases is strong or weak, and if the coupling is weak, a third switch that is always off and a fourth switch that is always on can be added in each phase to save switching power in weak coupling case.

In another feature, a multiphase DC-DC converter comprises a coupled inductor that includes first and second inductors coupled together; a first phase including first high side and low side switches connected to the first inductor, where the first low side switch includes a first plurality of switches connected in series; and a second phase including second high side and low side switches connected to the second inductor, where the second low side switch includes a second plurality of switches connected in series. A controller drives the first and second high side switches and the first and second low side switches to operate the DC-DC converter in discontinuous conduction mode. Body diodes of first and second low side switches do not conduct. Further, the controller can detect whether coupling between the first and second phases is strong or weak, and if the coupling is weak, the controller keeps the second plurality of switches always on to save switching power in weak coupling case.

In another feature, a multiphase DC-DC converter comprises a coupled inductor that includes first and second inductors coupled together, a first phase including first high side and low side switches connected to the first inductor, and a second phase including second high side and low side switches connected to the second inductor. A third switch is connected across bulk and source terminals of the second low side switch. A fourth switch is connected across bulk terminal of the second low side switch and a voltage source. A controller drives the first and second high side switches and the first and second low side switches to operate the DC-DC converter in discontinuous conduction mode. The controller turns off the third switch and turns on the fourth switch in response to the first high side switch being turned on. A body diode of the second low side switch does not conduct. Further, the controller can detect whether coupling between the first and second phases is strong or weak, and if the coupling is weak, a third switch that is always on and a fourth switch that is always off can be added in each phase to save switching power in weak coupling case.

In another feature, a multiphase DC-DC converter comprises a coupled inductor that includes first and second inductors coupled together, and a third inductor that is not coupled to the first and second inductors. First and second phases of the DC-DC converter are respectively connected to the first and second inductors. A third phase of the DC-DC converter is connected to the third inductor. A controller selects the first and second phases in response to operating the DC-DC converter in continuous conduction mode, and selects the third phase in response to operating the DC-DC converter in discontinuous conduction mode.

In another feature, a multiphase DC-DC converter comprises a coupled inductor that includes a first inductor and a plurality of inductors, where the first inductor is coupled to each of the plurality of inductors. A first phase and a plurality of phases of the DC-DC converter are respectively connected to the first inductor and the plurality of inductors. A controller selects the first phase in response to operating the DC-DC converter in discontinuous conduction mode, and selects one or more of the first phase and the plurality of phases in response to operating the DC-DC converter in continuous conduction mode.

In another feature, a multiphase DC-DC converter comprises a coupled inductor that includes a plurality of inductors, each inductor being coupled to two neighboring inductors or to rest of the inductors. A plurality of phases of the DC-DC converter is respectively connected to the plurality of inductors. A controller operates the DC-DC converter in continuous conduction mode and in discontinuous conduction mode. Body diodes of switches in the plurality of phases do not conduct when the DC-DC converter operates in discontinuous conduction mode.

In another feature, a multiphase DC-DC converter comprises a coupled inductor that includes first and second inductors coupled together, a first phase including first high side and low side switches connected to the first inductor, and a second phase including second high side and low side switches connected to the second inductor. A controller drives the first and second high side switches and the first and second low side switches to operate the multiphase DC-DC converter. In response to operating the multiphase DC-DC converter in discontinuous conduction mode and in response to the first high side switch being turned on, the controller prevents conduction of a body diode of the second low side switch by bypassing current around the second low side switch body diode, blocking current from flowing through the second low side switch body diode, or increasing threshold for conduction of the second low side switch body diode.

In other features, the controller prevents second low side switch body diode conduction, depending on a strength of coupling between the first inductor and the second inductor. The controller determines, in response to the first high side switch being turned on and the second low side switch being turned off, that coupling between the first inductor and the second inductor is strong or weak, based on whether the body diode of the second low side switch will conduct if not prevented from conducting. The controller prevents second low side switch body diode conduction in response to the first high side switch being turned on when the coupling is strong. The controller does not prevent second low side switch body diode conduction in response to the first high side switch being turned on when the coupling is weak.

In other features, the controller determines that the coupling between the first inductor and the second inductor is strong or weak based on currents through one or more of the first and second inductors of the coupled inductor; or currents through one or more of the first and second high side and/or low side switches; or voltages at one or more of a first node at which the first inductor is connected to the first high side and low side switches and a second node at which the second inductor is connected to the second high side and low side switches.

In other features, the controller determines that the coupling between the first inductor and the second inductor is weak, based on the body diode of the second low side switch not conducting when the first high side switch is turned on and when the second low side switch is turned off. The controller determines that the coupling between the first conductor and the second conductor is strong, based on the body diode of the second low side switch conducting when the first high side switch is turned on and when the second low side switch is turned off.

In other features, the controller determines that the coupling between the first inductor and the second inductor is weak, based on a voltage at a node at which the second inductor is connected to the second high side and low side switches not being clamped by the body diode of the second low side switch when the first high side switch is turned on and when the second low side switch is turned off. The controller determines that the coupling between the first conductor and the second conductor is strong based on the voltage at the node being clamped by the body diode of the second low side switch when the first high side switch is turned on and when the second low side switch is turned off.

In other features, the controller turns on the second low side switch in response to the first high side switch being turned on when the coupling is strong, to prevent the body diode of the second low side switch from conducting. The controller does not turn on the second low side switch in response to the first high side switch being turned on when the coupling is weak, to prevent negative current flow through the second low side switch.

In still other features, the multiphase DC-DC converter further comprises a fifth switch connected between the first high side and low side switches. The body diodes of the fifth switch and the first low side switch are connected back-to-back. The multiphase DC-DC converter further comprises a sixth switch connected between the second high side and low side switches. The body diodes of the sixth switch and the second low side switch are connected back-to-back. The controller decreases a tendency for conduction of body diodes of the first and second low side switches by turning off the sixth switch in response to the first high side switch being turned on and by turning off the fifth switch in response to the second high side switch being turned on, whereby the body diodes of the first and second low side switches do not conduct.

In other features, in response to the controller operating the multiphase DC-DC converter in continuous conduction mode, the controller turns on the fifth and sixth switches.

In other features, each of the first and second phases includes a level shifter that converts a first control signal from the controller from a first supply rail to a second supply rail comprising a voltage lower than a switching node voltage and that outputs a second control signal to drive the fifth or sixth switches. The body diodes of the first and second low side switches do not conduct irrespective of strength of coupling between the first inductor and the second inductor.

In other features, in response to the controller operating the multiphase DC-DC converter in skip mode where the second low side switch is turned on when the first high side switch is turned on and where inductor currents of the first and second phases do not overlap, the first control signal and a third control signal that drives the first high side switch are of opposite polarities.

In still other features, the multiphase DC-DC converter further comprises a fifth switch connected across bulk and drain terminals of the second low side switch and a sixth switch connected across bulk and source terminals of the second low side switch. The controller decreases a tendency for conduction of the body diodes of the second low side switch by turning on the sixth switch in response to the first high side switch being turned on and a voltage at a junction of the second high side and low side switches having a first polarity, and by turning on the fifth switch in response to the first high side switch being turned on and the voltage at the junction of the second high side and low side switches having a second polarity that is opposite to the first polarity. The body diodes of the second low side switch do not conduct.

In other features, each of the first and second phases includes a level shifter that converts a first control signal from the controller from a first supply rail to a second supply rail comprising a voltage lower than a switching node voltage and that outputs a second control signal to drive the first or second low side switch. The body diodes of the first and second low side switches do not conduct irrespective of strength of coupling between the first inductor and the second inductor.

In other features, in response to the controller operating the multiphase DC-DC converter in continuous conduction mode, the controller turns off the fifth switch and turns on the sixth switch.

In other features, in response to the controller operating the multiphase DC-DC converter in skip mode where the second low side switch is turned on when the first high side switch is turned on, the fifth and sixth switches are turned on or off based on the voltage at the junction of the second high side and low side switches.

In still other features, the first low side switch includes a first plurality of switches connected in series, and the second low side switch includes a second plurality of switches connected in series. The controller decreases a tendency for conduction of body diodes of the first and second low side switches by controlling the first and second plurality of switches. The body diodes of the first and second low side switches do not conduct.

In other features, the first and second plurality of switches decrease a tendency for conduction of the body diodes of the first and second low side switches and prevent conduction of the body diodes of first and second low side switches.

In other features, if an integer N greater than 1 denotes a number of switches in each of the first and second plurality of switches, voltages at nodes at which the first and second high side switches are connected to the first and second low side switches are negative by N times a forward voltage drop of a body diode of a switch in the first and second plurality of switches to prevent conduction of the body diodes of first and second low side switches.

In other features, each of the first and second phases includes a plurality of level shifters that convert a control signal from the controller from a first supply rail to a second supply rail comprising a voltage lower than a switching node voltage and that output a plurality of control signals to drive the first and second plurality of switches. The body diodes of the first and second low side switches do not conduct irrespective of strength of coupling between the first inductor and the second inductor.

In still other features, the multiphase DC-DC converter further comprises a fifth switch connected across bulk and source terminals of the second low side switch and a sixth switch connected across bulk terminal of the second low side switch and a voltage source. The controller decreases a tendency for conduction of the body diode of the second low side switch by turning off the fifth switch and turning on the sixth switch in response to the first high side switch being turned on. The body diode of the second low side switch does not conduct.

In other features, the voltage source supplies a voltage of the same polarity as the type of a dopant used for the switches.

In other features, in each of the first and second phases, in response to the switches using N type dopant, the voltage source supplies a negative voltage that is more negative than a lowest voltage at a switching node to prevent body diodes of the first and second low side switches from conducting.

In other features, each of the first and second phases includes a level shifter that converts a first control signal from the controller from a first supply rail to a second supply rail comprising a voltage lower than a switching node voltage and that outputs a second control signal to drive the first or second low side switch. The body diodes of the first and second low side switches do not conduct irrespective of strength of coupling between the first inductor and the second inductor.

In other features, in response to the controller operating the multiphase DC-DC converter in continuous conduction mode, the controller turns on the fifth switch and turns off the sixth switch.

In other features, in response to the controller operating the multiphase DC-DC converter in skip mode where the second low side switch is turned on when the first high side switch is turned on, the controller turns off the fifth switch and turns on the sixth switch.

In still other features, an inductance matrix of the coupled inductor ensures that a coupling voltage across the body diode is less than a forward voltage drop of the body diode.

In still other features, the controller blocks current from flowing through the body diode in the event that a voltage across the second low side switch is greater than a forward voltage drop of the body diode.

In another feature, a multiphase DC-DC converter comprises a coupled inductor that includes first and second inductors coupled together, a first phase including first high side and low side switches connected to the first inductor, and a second phase including second high side and low side switches connected to the second inductor. A controller drives the first and second high side switches and the first and second low side switches to operate the multiphase DC-DC converter in discontinuous conduction mode. The controller determines, in response to the first high side switch being turned on and the second low side switch being turned off, that coupling between the first inductor and the second inductor is strong or weak based on whether a body diode of the second low side switch will conduct if not prevented from conducting. The controller prevents second low side switch body diode conduction in response to the first high side switch being turned on when the coupling is strong. The controller does not prevent second low side switch body diode conduction in response to the first high side switch being turned on when the coupling is weak.

In other features, the controller determines that the coupling between the first inductor and the second inductor is strong or weak based on currents through one or more of the first and second inductors of the coupled inductor, or currents through one or more of the first and second high side and/or low side switches, or based on voltages at one or more of a first node at which the first inductor is connected to the first high side and low side switches and a second node at which the second inductor is connected to the second high side and low side switches.

In other features, the controller determines that the coupling between the first inductor and the second inductor is weak based on the body diode of the second low side switch not conducting when the first high side switch is turned on and when the second low side switch is turned off. The controller determines that the coupling between the first inductor and the second inductor is strong based on the body diode of the second low side switch conducting when the first high side switch is turned on and when the second low side switch is turned off.

In other features, the controller determines that the coupling between the first inductor and the second inductor is weak based on a voltage at a node at which the second inductor is connected to the second high side and low side switches not being clamped by the body diode of the second low side switch when the first high side switch is turned on and when the second low side switch is turned off. The controller determines that that the coupling between the first inductor and the second inductor is strong based on the voltage at the node being clamped by the body diode of the second low side switch when the first high side switch is turned on and when the second low side switch is turned off.

In other features, the controller turns on the second low side switch in response to the first high side switch being turned on when the coupling is strong to prevent the body diode of the second low side switch from conducting, and does not turn on the second low side switch in response to the first high side switch being turned on when the coupling is weak to prevent negative current flow through the body diode of the second low side switch.

In another feature, a multiphase DC-DC converter comprises a coupled inductor that includes first and second inductors coupled together, a first phase including first high side and low side switches connected to the first inductor, and a second phase including second high side and low side switches connected to the second inductor. The multiphase DC-DC converter further comprises a third switch connected between the first high side and low switches, where body diodes of the third switch and the first low side switch are connected back-to-back; and a fourth switch connected between the second high side and low switches, where body diodes of the fourth switch and the second low side switch are connected back-to-back. A controller drives the first and second high side switches and the first and second low side switches to operate the multiphase DC-DC converter. In response to the controller operating the multiphase DC-DC converter in discontinuous conduction mode, the controller turns on the fourth switch only in response to the first high side switch being turned on and turns on the third switch only in response to the second high side switch being turned on. The body diodes of the first and second low side switches do not conduct.

In other features, each of the first and second phases includes a level shifter that converts a first control signal from the controller from a first supply rail to a second supply rail comprising a voltage lower than a switching node voltage and that outputs a second control signal to drive the third or fourth switches. The body diodes of the first and second low side switches do not conduct irrespective of strength of coupling between the first inductor and the second inductor.

In other features, in response to the controller operating the multiphase DC-DC converter in continuous conduction mode, the controller turns on the third and fourth switches.

In other features, in response to the controller operating the multiphase DC-DC converter in skip mode where the second low side switch is turned on when the first high side switch is turned on and where inductor currents of the first and second phases do not overlap, the first control signal and a third control signal that drives the first high side switch are of opposite polarities.

In another feature, a multiphase DC-DC converter comprises a coupled inductor that includes first and second inductors coupled together, a first phase including first high side and low side switches connected to the first inductor, and a second phase including second high side and low side switches connected to the second inductor. The multiphase DC-DC converter further comprises a third switch connected across bulk and drain terminals of the second low side switch and a fourth switch connected across bulk and source terminals of the second low side switch. A controller drives the first and second high side switches and the first and second low side switches to operate the multiphase DC-DC converter. In response to the controller operating the multiphase DC-DC converter in discontinuous conduction mode, the controller turns on the fourth switch in response to the first high side switch being turned on and a voltage at a junction of the second high side and low side switches having a first polarity, and turns on the third switch in response to the first high side switch being turned on and the voltage at the junction of the second high side and low side switches having a second polarity that is opposite to the first polarity. A body diode of the second low side switch does not conduct.

In other features, each of the first and second phases includes a level shifter that converts a first control signal from the controller from a first supply rail to a second supply rail comprising a voltage lower than a switching node voltage and that outputs a second control signal to drive the first or second low side switch. The body diodes of the first and second low side switches do not conduct irrespective of strength of coupling between the first inductor and the second inductor.

In other features, in response to the controller operating the multiphase DC-DC converter in continuous conduction mode, the controller turns off the third switch and turns on the fourth switch.

In other features, in response to the controller operating the multiphase DC-DC converter in skip mode where the second low side switch is turned on when the first high side switch is turned on, the third and fourth switches are turned on or off based on the voltage at the junction of the second high side and low side switches.

In another feature, a multiphase DC-DC converter comprises a coupled inductor that includes first and second inductors coupled together; a first phase including first high side and low side switches connected to the first inductor, where the first low side switch includes a first plurality of switches connected in series; and a second phase including second high side and low side switches connected to the second inductor, where the second low side switch includes a second plurality of switches connected in series. A controller drives the first and second high side switches and the first and second low side switches to operate the multiphase DC-DC converter in discontinuous conduction mode. The body diodes of the first and second low side switches do not conduct.

In other features, the first and second plurality of switches decrease a tendency for conduction of the body diodes of the first and second low side switches and prevent conduction of the body diodes of first and second low side switches.

In other features, if an integer N greater than 1 denotes a number of switches in each of the first and second plurality of switches, voltages at nodes at which the first and second high side switches are connected to the first and second low side switches are negative by N times a forward voltage drop of a body diode of a switch in the first and second plurality of switches to prevent conduction of the body diodes of first and second low side switches.

In other features, each of the first and second phases includes a plurality of level shifters that convert a control signal from the controller from a first supply rail to a second supply rail comprising a voltage lower than a switching node voltage and that output a plurality of control signals to drive the first and second plurality of switches. The body diodes of the first and second low side switches do not conduct irrespective of strength of coupling between the first inductor and the second inductor.

In another feature, a multiphase DC-DC converter comprises a coupled inductor that includes first and second inductors coupled together, a first phase including first high side and low side switches connected to the first inductor, and a second phase including second high side and low side switches connected to the second inductor. The multiphase DC-DC converter further comprises a third switch connected across bulk and source terminals of the second low side switch and a fourth switch connected across bulk terminal of the second low side switch and a voltage source. A controller drives the first and second high side switches and the first and second low side switches to operate the multiphase DC-DC converter. In response to the controller operating the multiphase DC-DC converter in discontinuous conduction mode, the controller drives the first and second high side switches and the first and second low side switches to operate the multiphase DC-DC converter in discontinuous conduction mode, and turns off the third switch and turns on the fourth switch in response to the first high side switch being turned on. A body diode of the second low side switch does not conduct.

In other features, the voltage source supplies a voltage of the same polarity as the type of a dopant used for the switches.

In other features, in each of the first and second phases, in response to the switches using N type dopant, the voltage source supplies a negative voltage that is more negative than a lowest voltage at a switching node to prevent body diodes of the first and second low side switches from conducting.

In other features, each of the first and second phases includes a level shifter that converts a first control signal from the controller from a first supply rail to a second supply rail comprising a voltage lower than a switching node voltage and that outputs a second control signal to drive the first or second low side switch. The body diodes of the first and second low side switches do not conduct irrespective of strength of coupling between the first inductor and the second inductor.

In other features, in response to the controller operating the multiphase DC-DC converter in continuous conduction mode, the controller turns on the third switch and turns off the fourth switch.

In other features, in response to the controller operating the multiphase DC-DC converter in skip mode where the second low side switch is turned on when the first high side switch is turned on, the controller turns off the third switch and turns on the fourth switch.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

11

Figure 1:
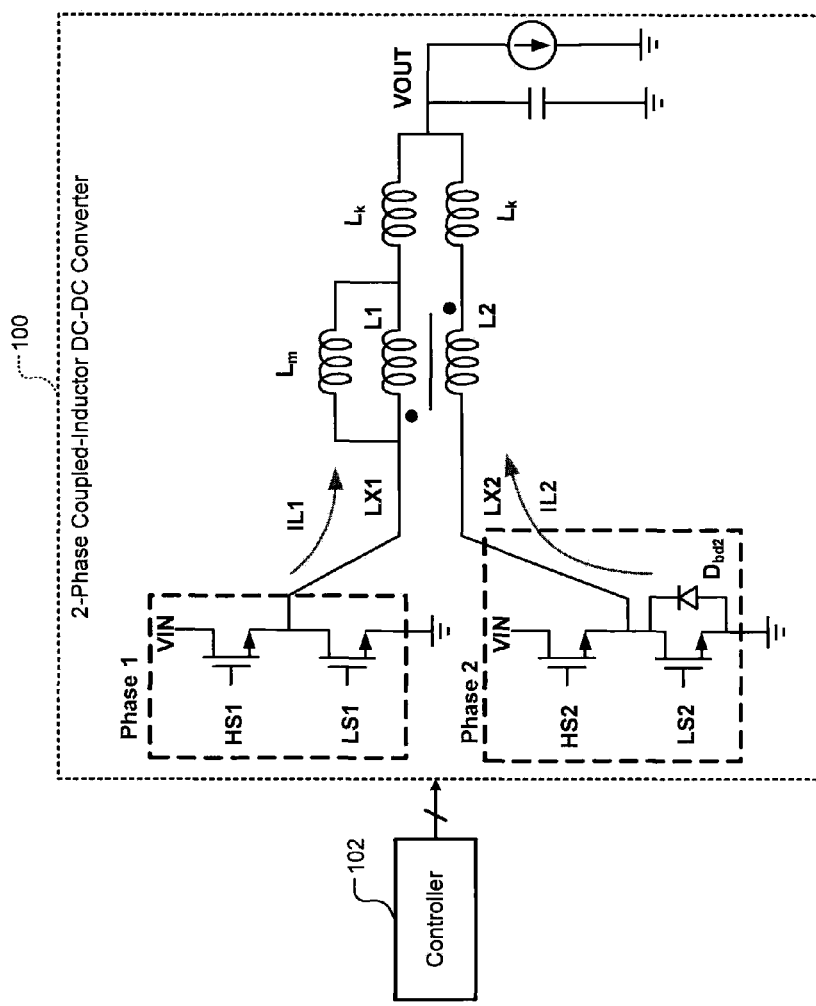
FIG. 1 is a schematic of a two-phase coupled inductor DC-DC converter.
Figure 5:
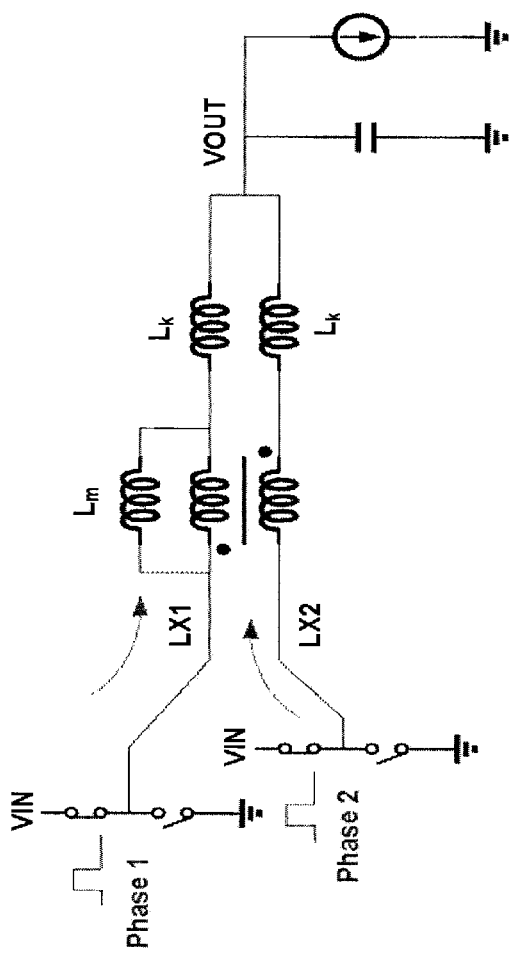
Figure 20:
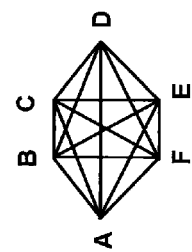
Figure 19:
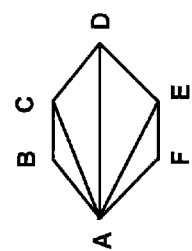
Figure 6:
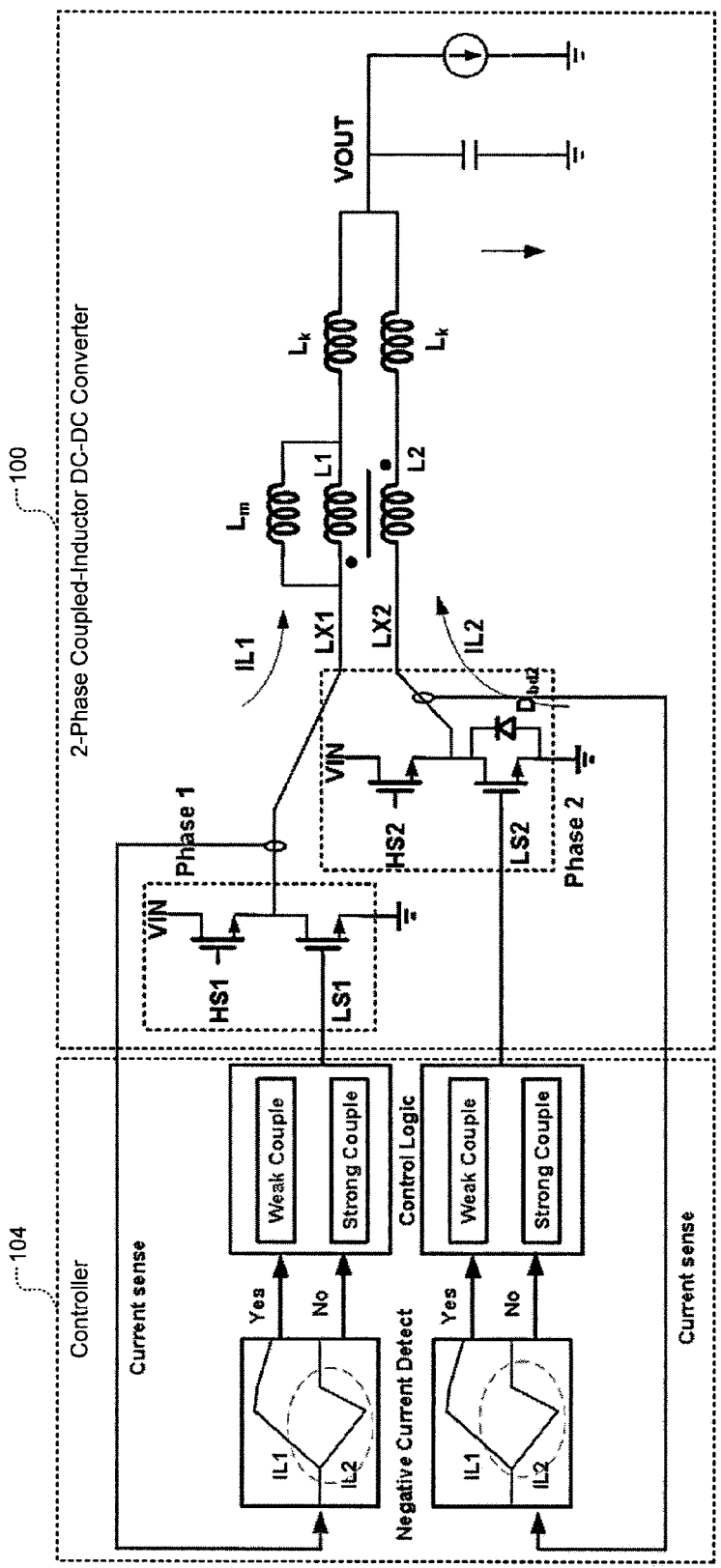
Figure 7:
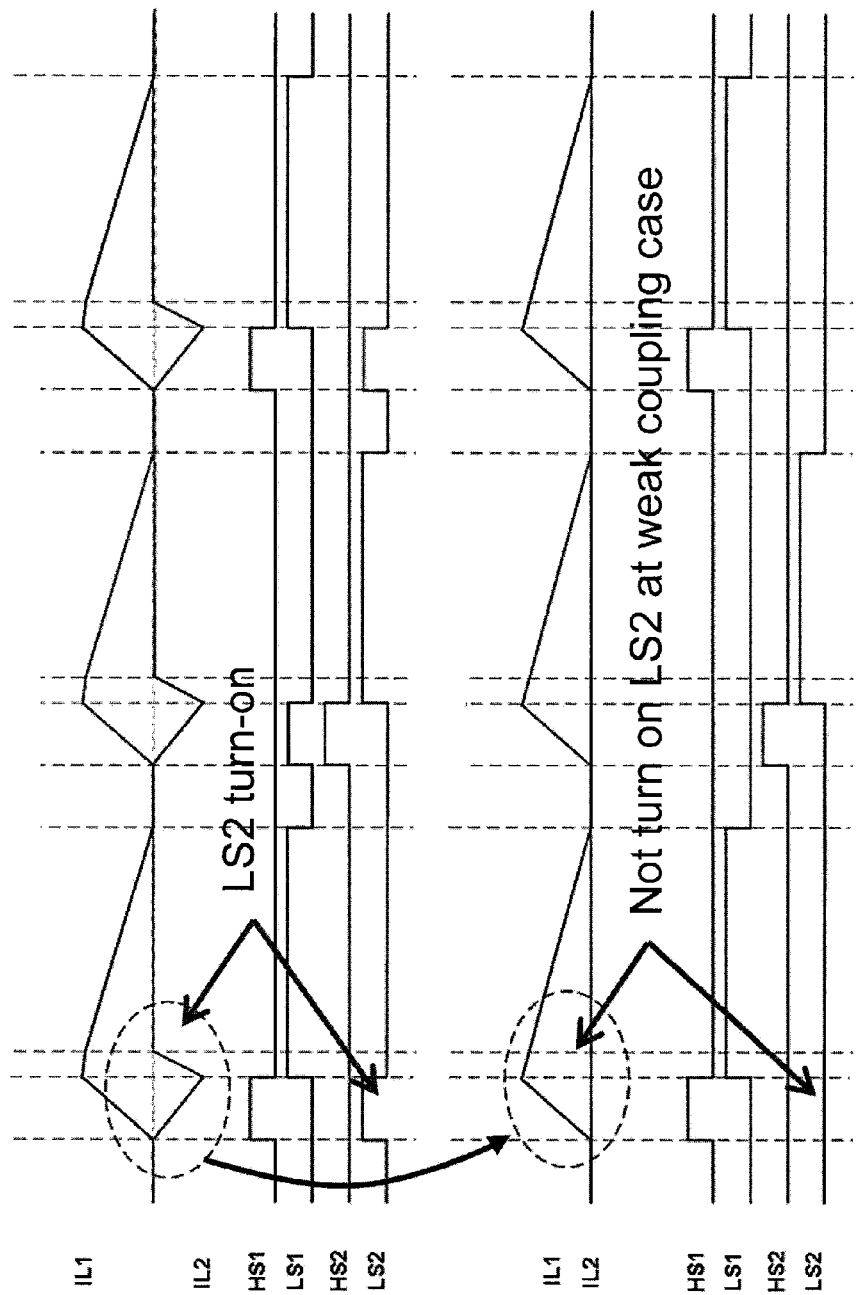
Figure 8:
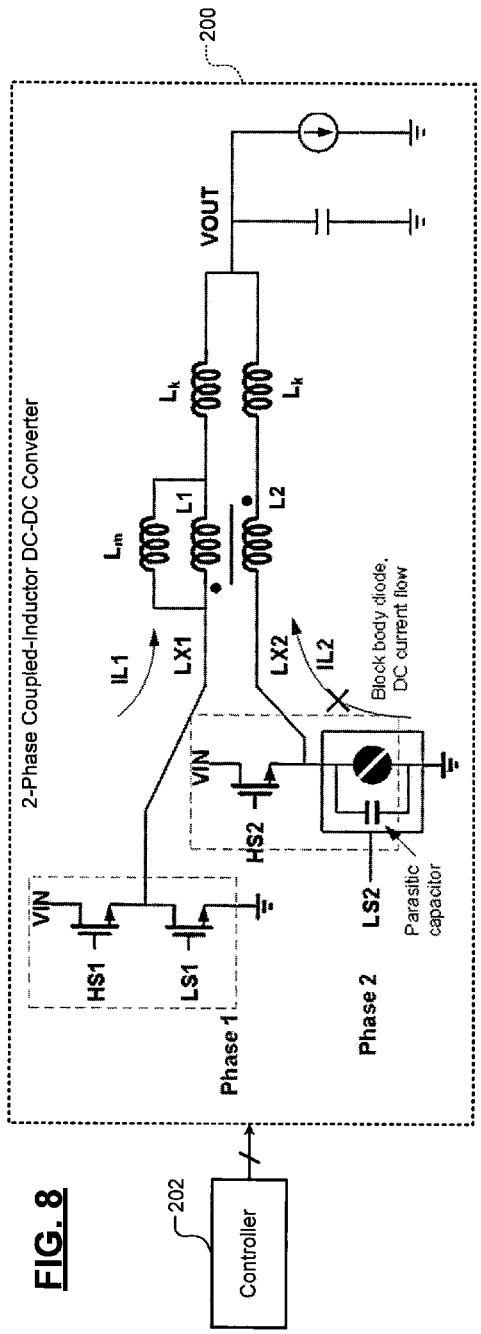
Figure 9:
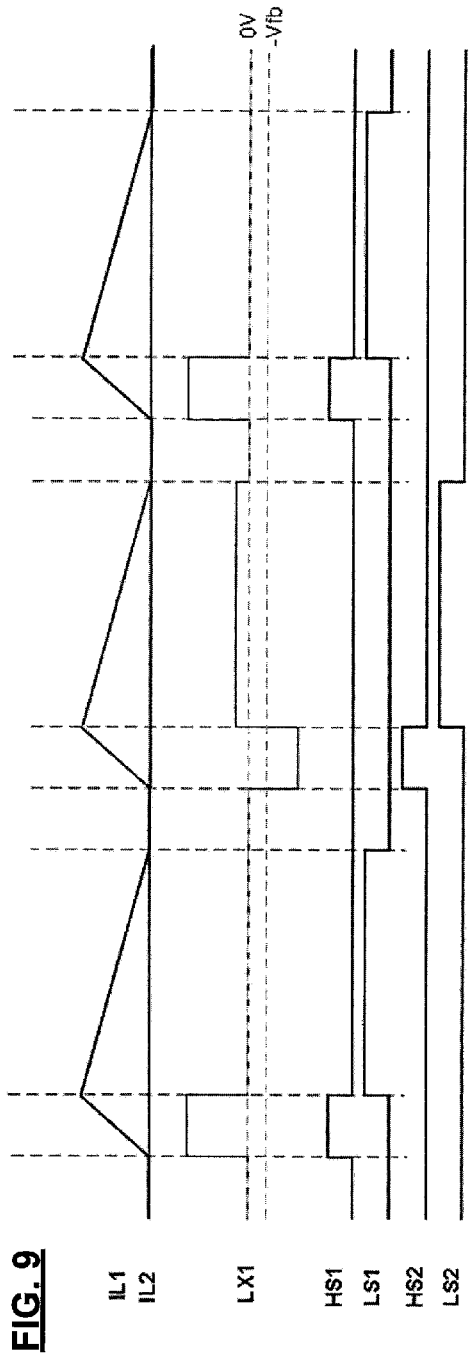
Figure 10:
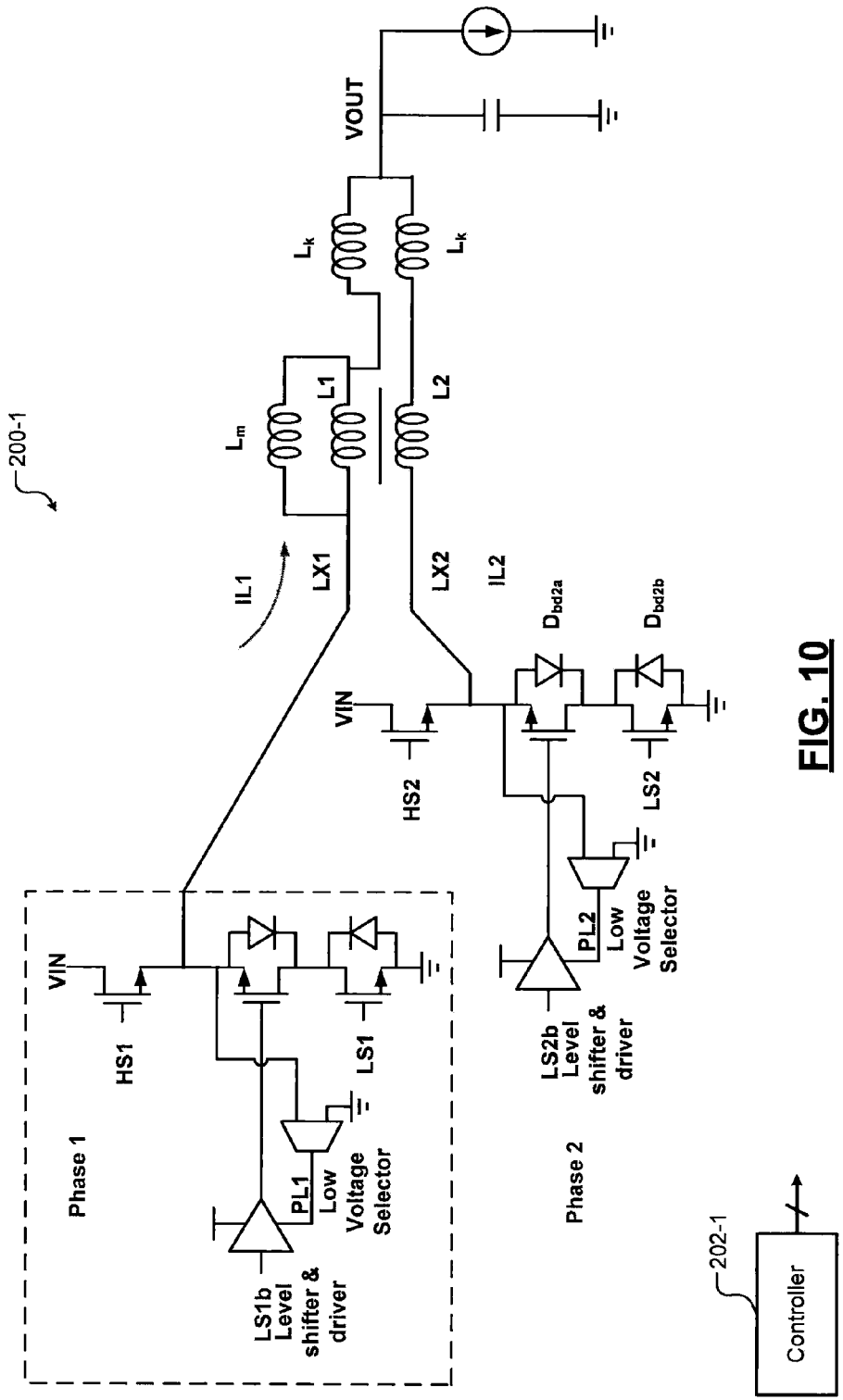
Figure 11:
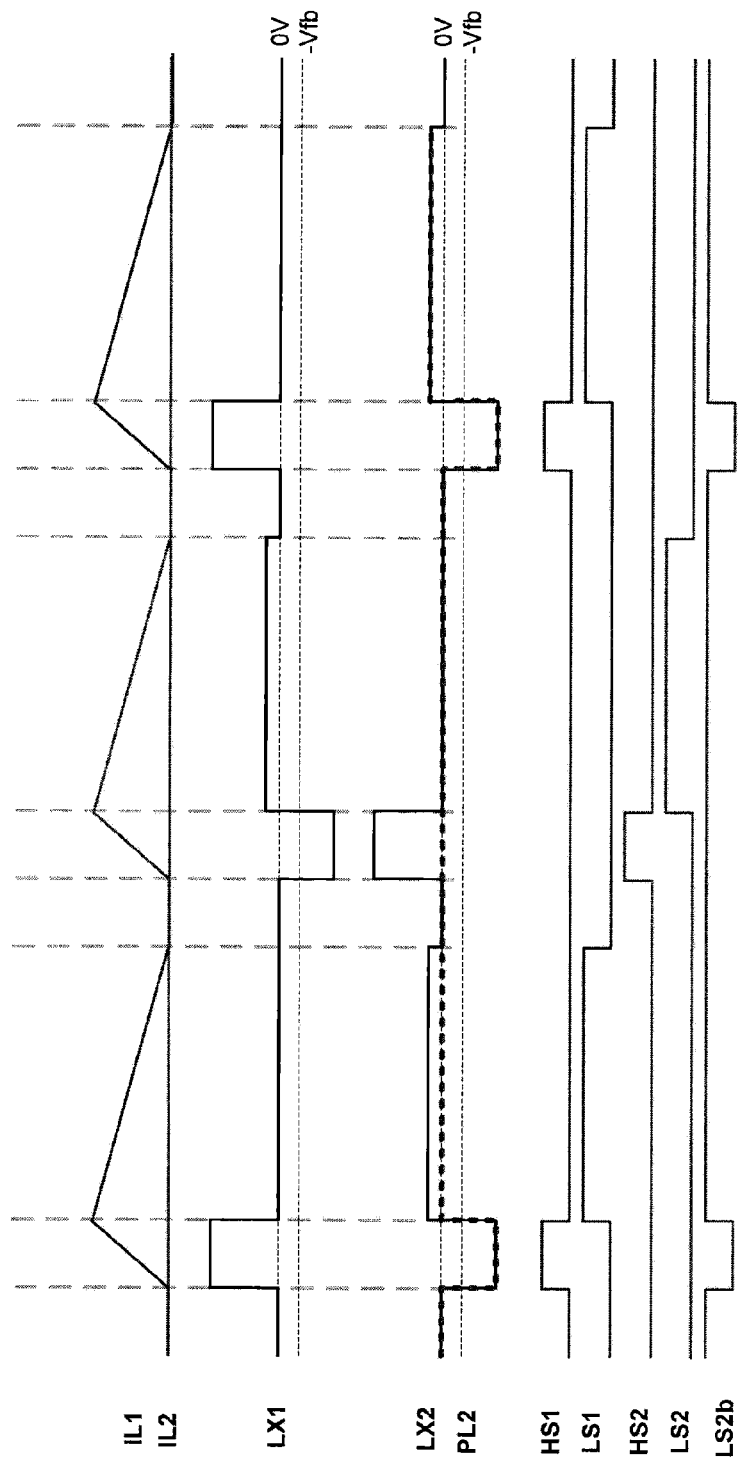
Figure 12:
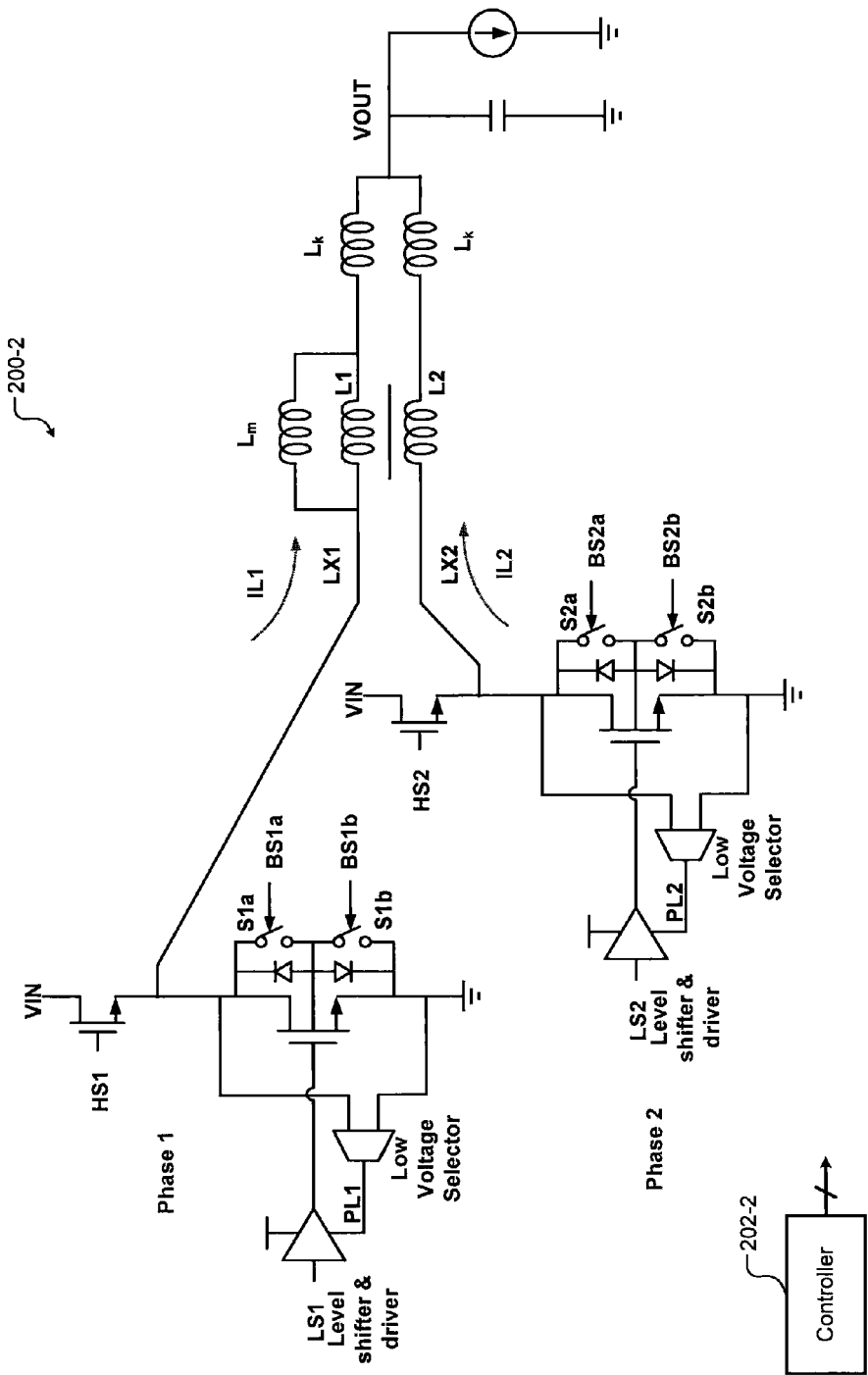
Figure 13:
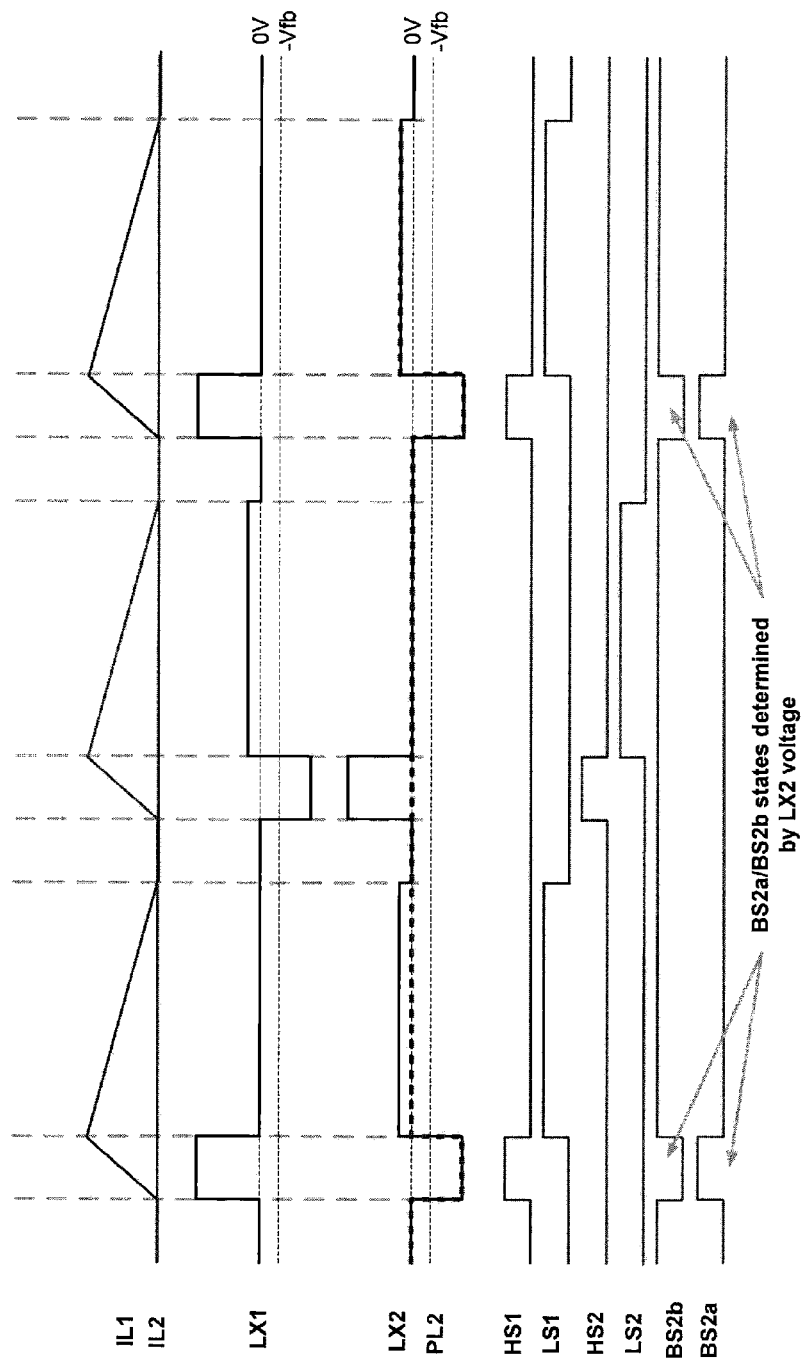
Figure 14:
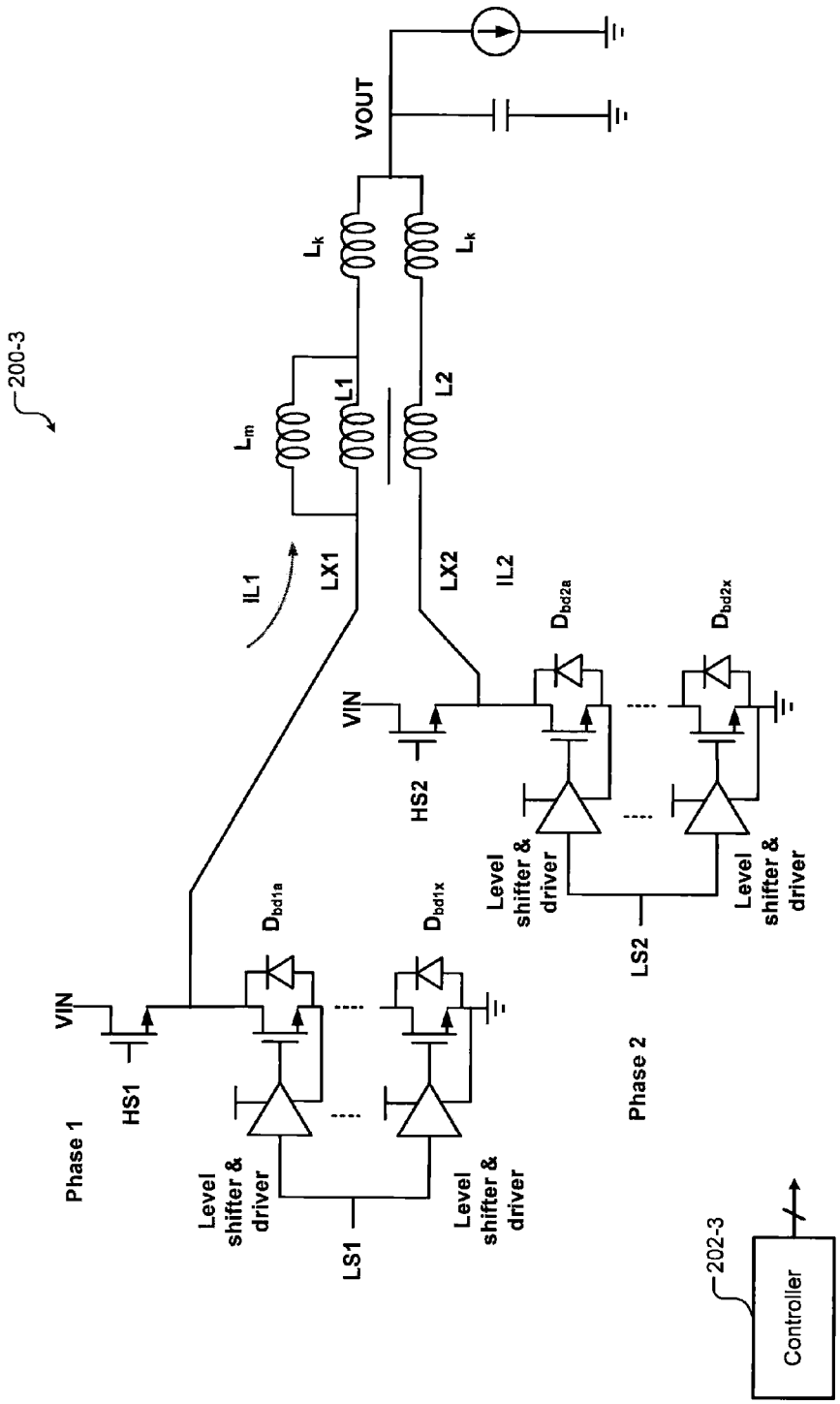
Figure 15:
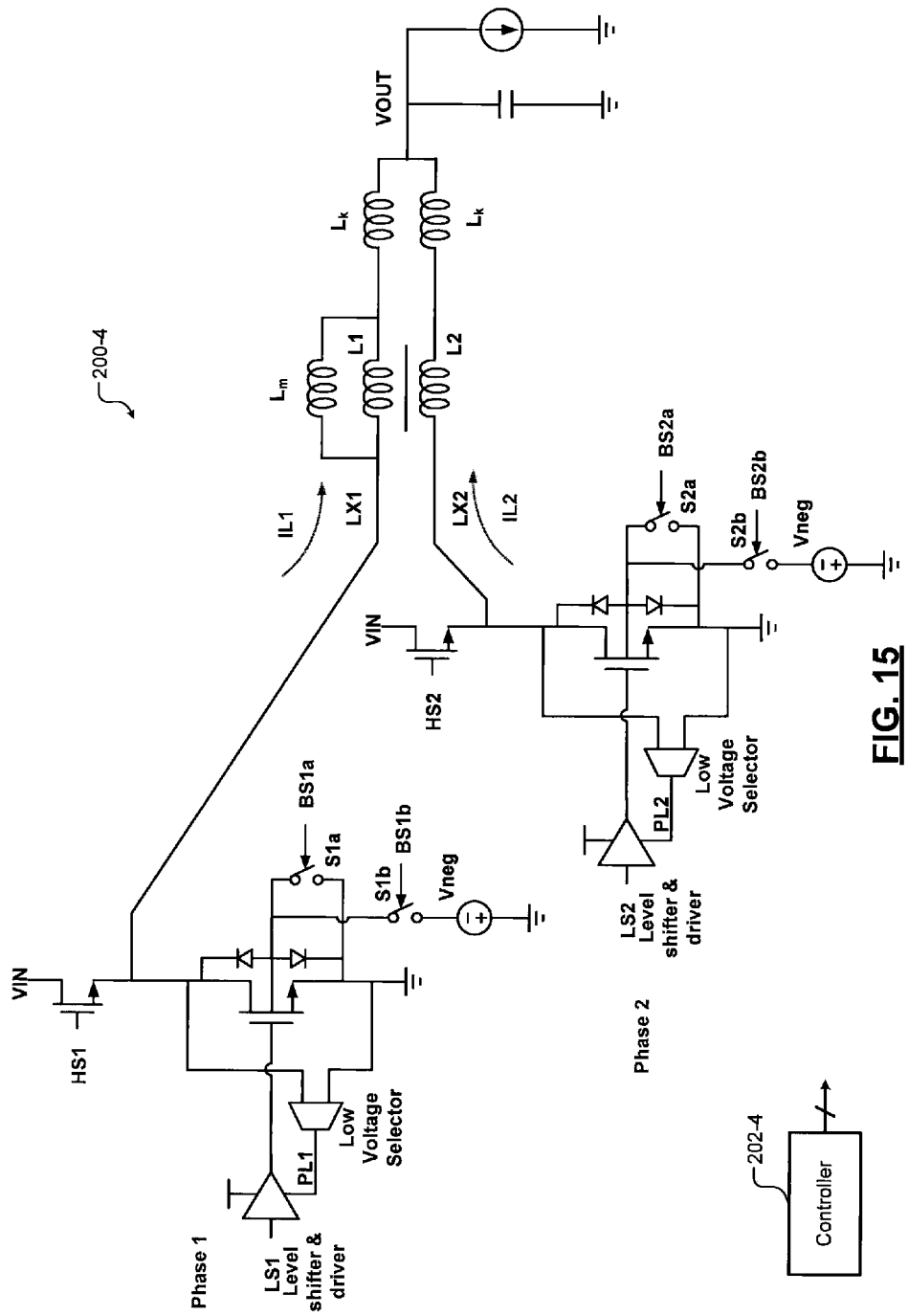
Figure 16:
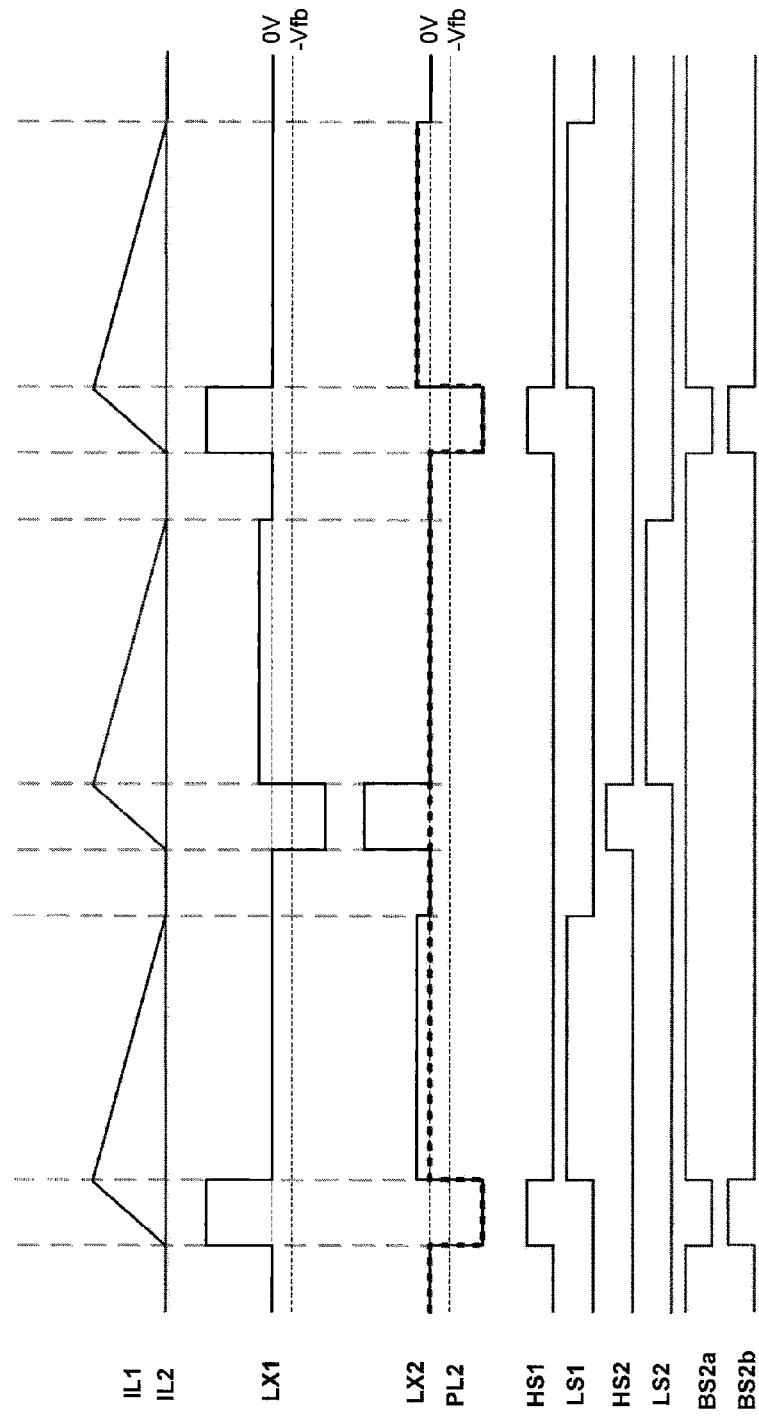
Figure 17:
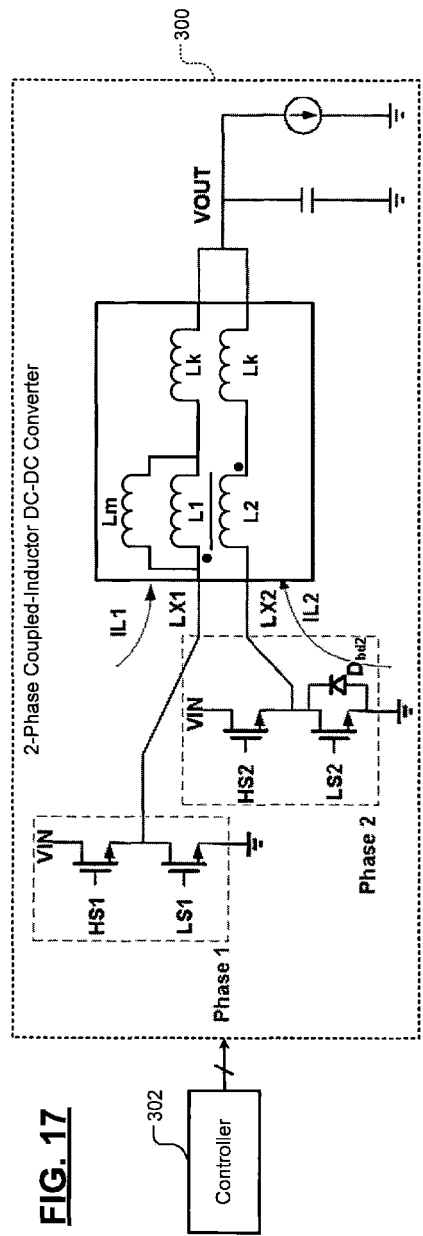
Figure 18:
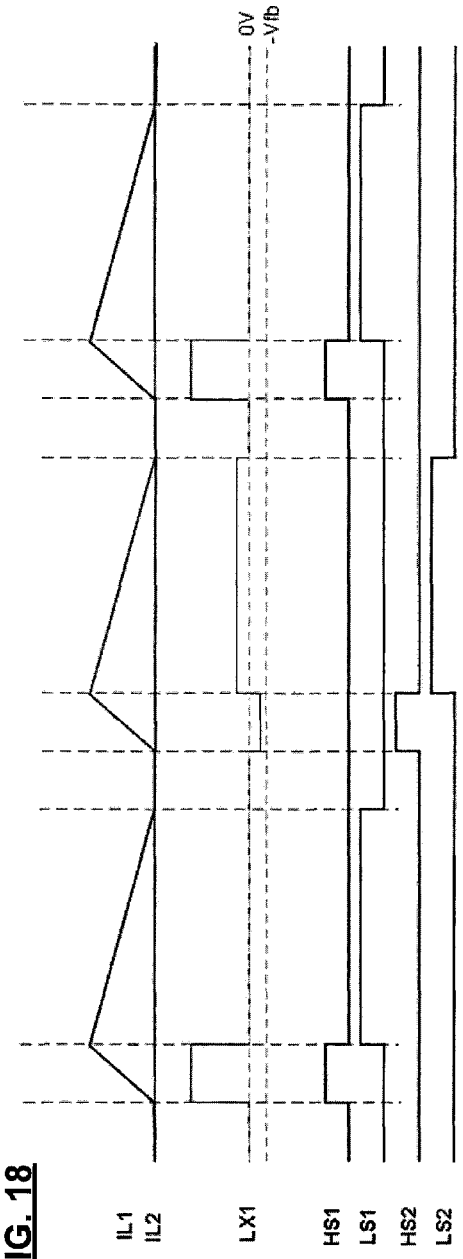
Figure 21:
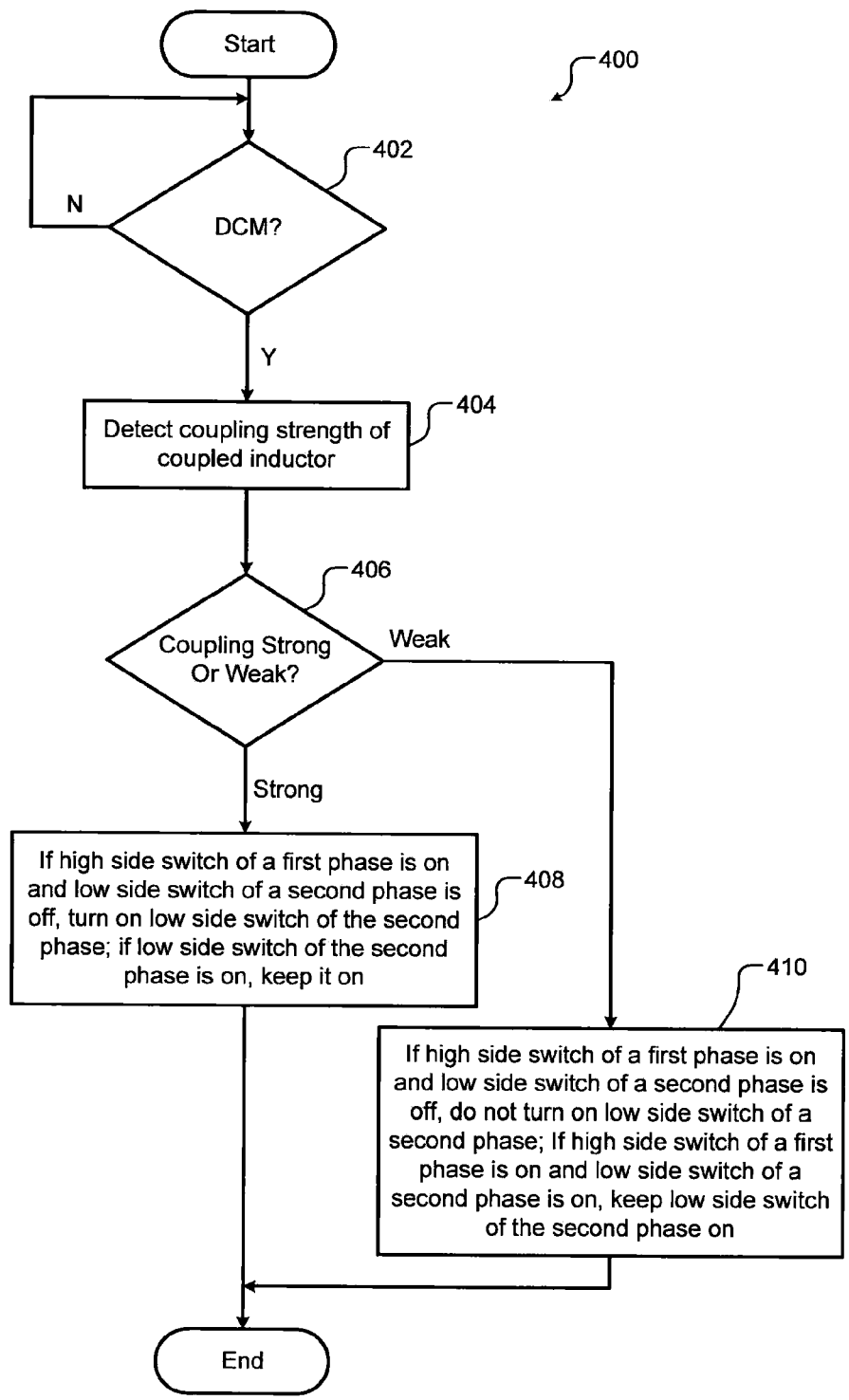
Figure 22:
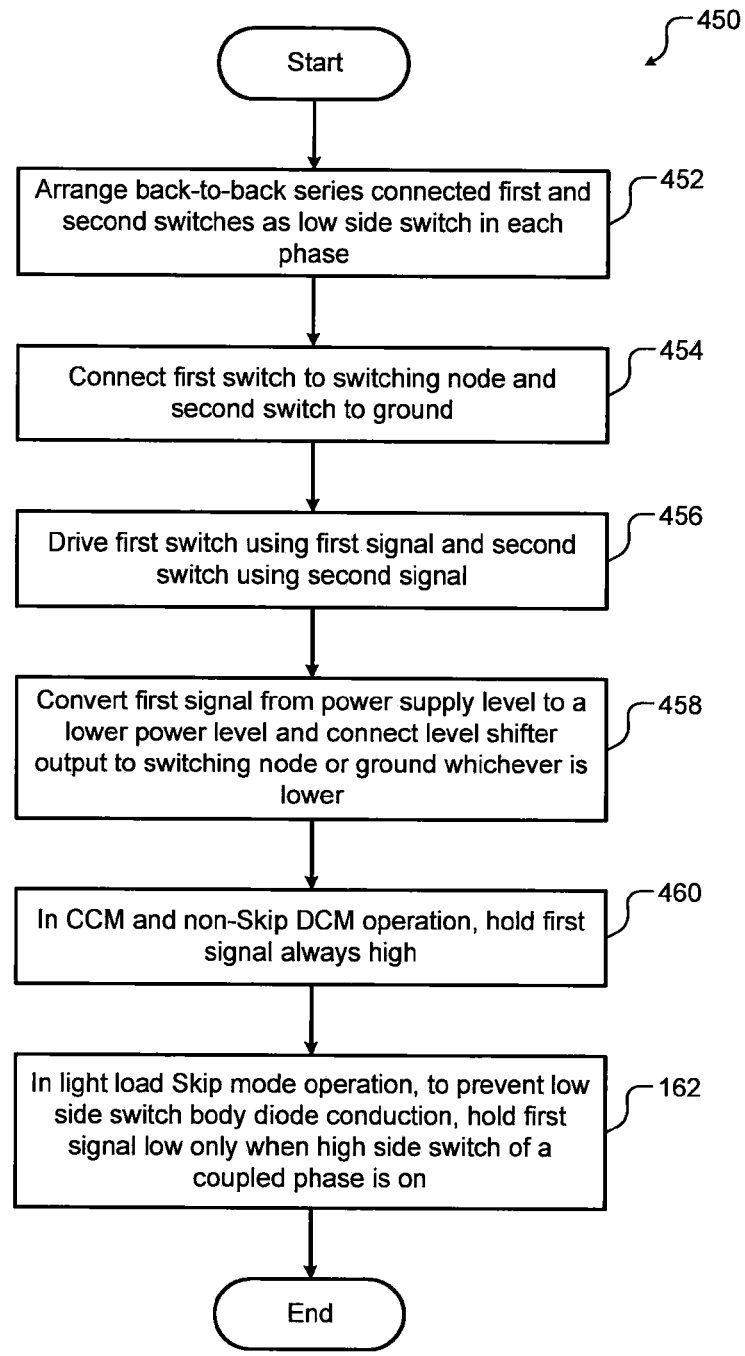
Figure 23:
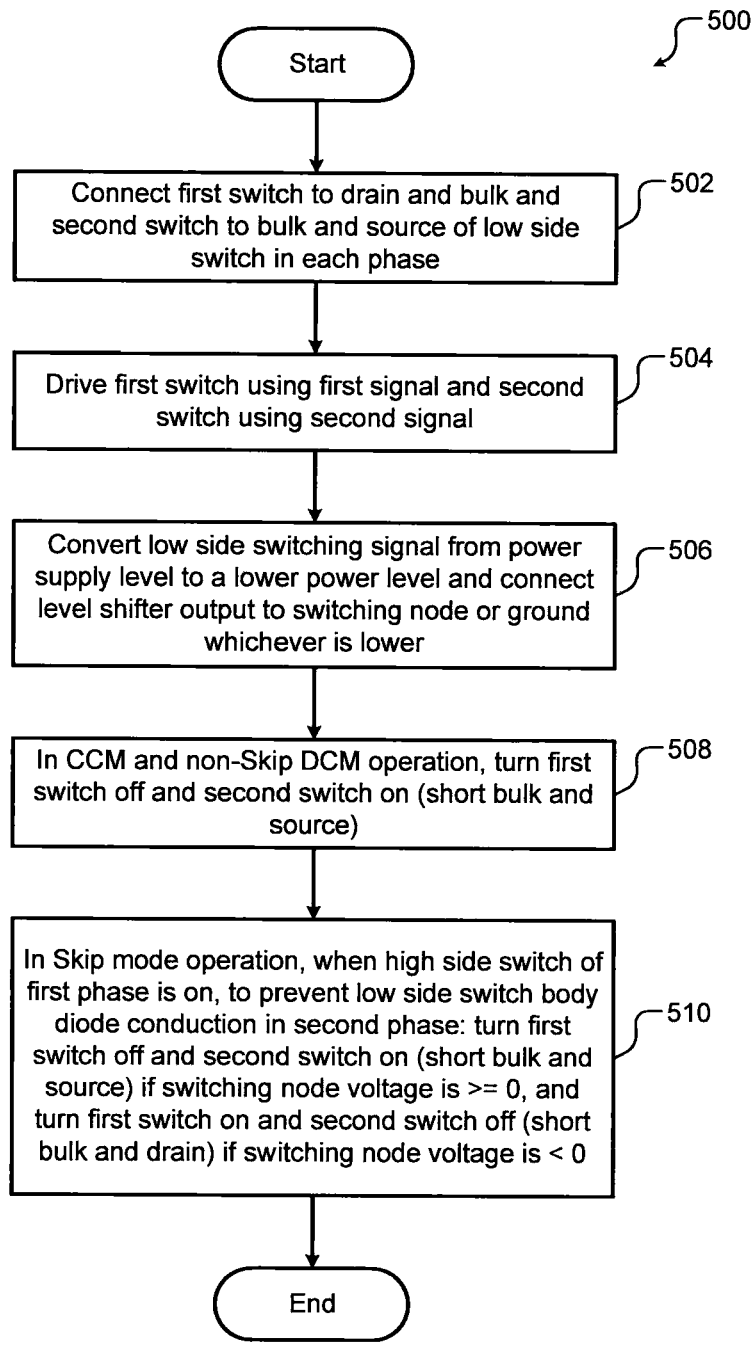
Figure 24:
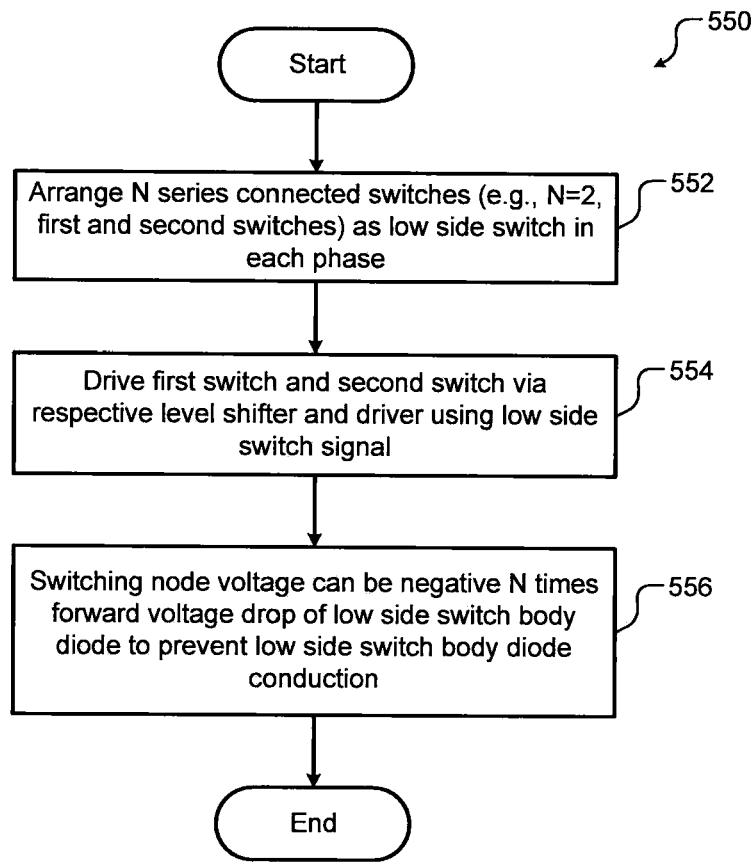
Figure 25:
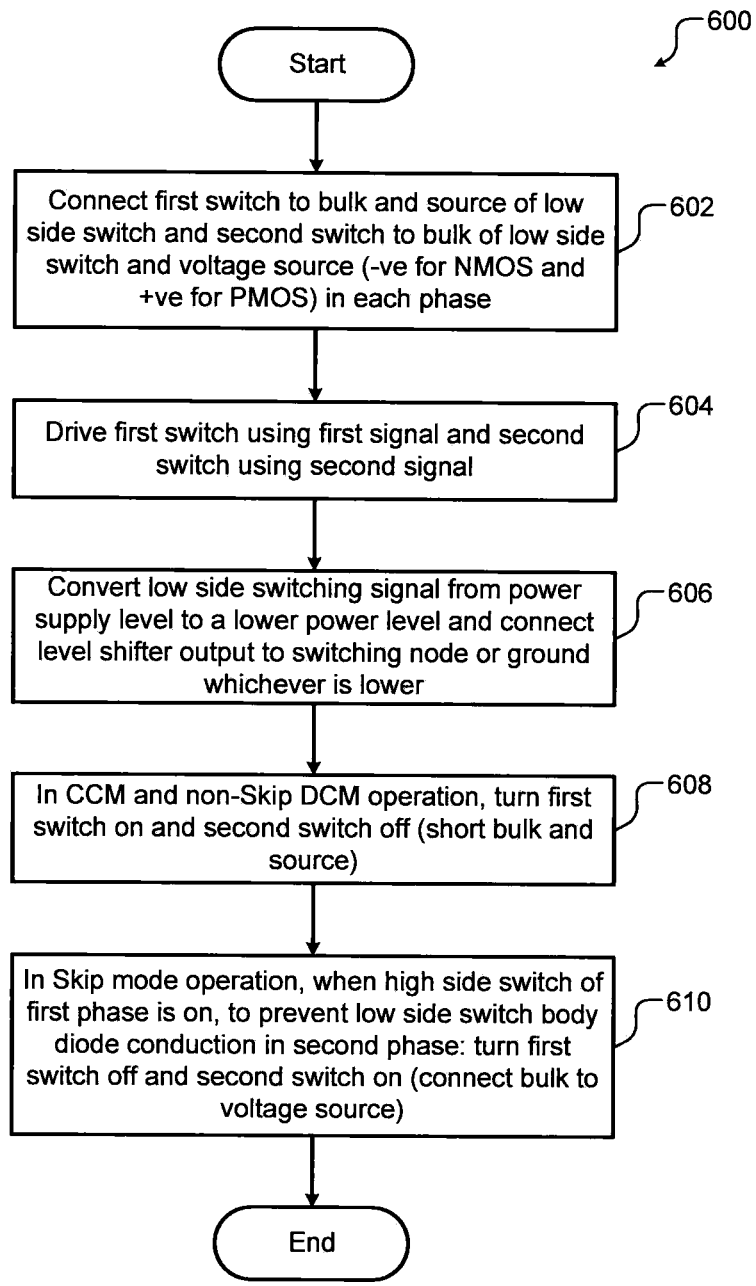

FIG. 3-5 depict show different ways of operating the two-phase coupled inductor DC-DC converter of FIG. 1 at light load in DCM;

FIG. 6 is a schematic of a two-phase coupled inductor DC-DC converter that detects coupling strength of the coupled inductor and that bypasses a body diode of a low side switch of when the coupling is weak in DCM;

FIG. 7 is a timing diagram showing operation of the two-phase coupled inductor DC-DC converter of FIG. 6 in DCM;

FIG. 8 is a schematic of a two-phase coupled inductor DC-DC converter that blocks body diode current flow when coupling strength of the coupled inductor is weak in DCM;

FIG. 9 is a timing diagram showing operation of the two-phase coupled inductor DC-DC converter of FIG. 8 in DCM;

FIG. 10 is a schematic of a two-phase coupled inductor DC-DC converter that prevents body diode conduction in DCM using a low side switch comprising back-to-back series connected switches;

FIG. 11 is a timing diagram showing operation of the two-phase coupled inductor DC-DC converter of FIG. 10 in DCM;

FIG. 12 is a schematic of a two-phase coupled inductor DC-DC converter that prevents body diode conduction in DCM by switching bulk connections of the low side switches;

FIG. 13 is a timing diagram showing operation of the two-phase coupled inductor DC-DC converter of FIG. 12 in DCM;

FIG. 14 is a schematic of a two-phase coupled inductor DC-DC converter that prevents body diode conduction in DCM using a low side switch comprising a plurality of series-connected switches;

FIG. 15 is a schematic of a two-phase coupled inductor DC-DC converter that prevents body diode conduction in DCM by biasing the bulk of the low side switches to a more negative voltage;

FIG. 16 is a timing diagram showing operation of the two-phase coupled inductor DC-DC converter of FIG. 15 in DCM;

FIG. 17 is a schematic of a two-phase coupled inductor DC-DC converter that prevents body diode conduction in DCM using modified coupled inductor topologies and/or connections;

FIG. 18 is a timing diagram showing operation of the two-phase coupled inductor DC-DC converter of FIG. 17 in DCM;

FIGS. 19 and 20 depict examples of modified coupled inductor topologies and/or connections that can be used in the two-phase coupled inductor DC-DC converter of FIG. 17;

FIG. 21 shows a flowchart of a method for preventing conduction of a body diode of a low side switch of a coupled-inductor DC-DC converter operating at light load in DCM by detecting strong or weak coupling;

FIG. 22 shows a flowchart of a method for preventing conduction of a body diode of a low side switch of a coupled-inductor DC-DC converter operating at light load in DCM by using a low side switch comprising back-to-back series connected switches;

FIG. 23 shows a flowchart of a method for preventing conduction of a body diode of a low side switch of a coupled-inductor DC-DC converter operating at light load in DCM by switching bulk connections of the low side switch;

FIG. 24 shows a flowchart of a method for preventing conduction of a body diode of a low side switch of a coupled-inductor DC-DC converter operating at light load in DCM by using a low side switch comprising a plurality of series-connected switches; and FIG. 25 shows a flowchart of a method for preventing conduction of a body diode of a low side switch of a coupled-inductor DC-DC converter operating at light load in DCM by biasing bulk of the low side switch using a voltage source.

In the drawings, reference numbers may be reused to identify similar and/or identical elements.

DETAILED DESCRIPTION

Figure 2:
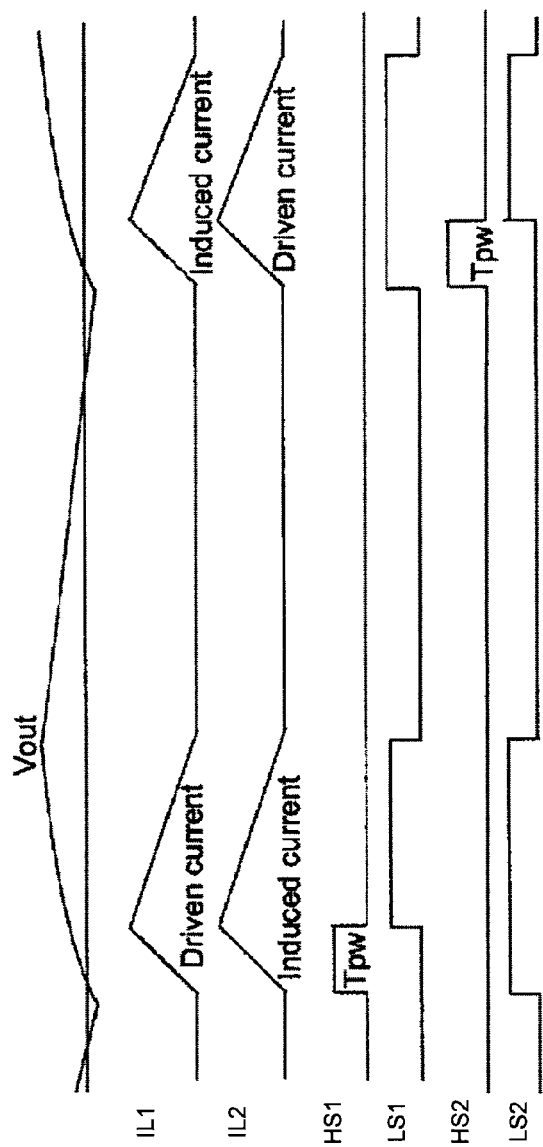
FIG. 2 is a timing diagram showing operation of the two-phase coupled inductor DC-DC converter of FIG. 1 in discontinuous conduction mode (DCM)

FIG. 1 shows an example of a two-phase coupled-inductor DC-DC converter 100. Each phase of the converter 100 includes a high side (HS) switch and a low side (LS) switch. The two phases are connected to a coupled inductor, which includes two inductors L1 and L2 that are coupled together. The coupled inductor has a magnetizing inductance Lm. Each of the inductors L1 and L2 has a corresponding leakage inductance Lk. The coupled inductor is connected to a load. A filter capacitor is connected across the load. A controller 102 generates pulse-width modulated (PWM) pulses that drive the HS and LS switches of the two phases as shown in FIG. 2. The controller 102 operates the converter 100 in CCM or DCM based on the power demand as follows.

In CCM, the controller 102 monitors an output voltage Vout at the capacitor. The controller 102 generates the PWM pulses to alternately turn on the first or second high side switches HS1 or HS2, which builds current through the associated winding L1 or L2 of the coupled inductor. As the current builds, magnetic coupling produces current through the un-driven winding L2 or L1 of the coupled inductor, and the associated low side switch LS2 or LS1 is turned on so that current through both windings L1 and L2 of the coupled inductor can charge the capacitor.

At the end of this part of the cycle, the high side switch HS1 or HS2 is turned off and the associated low side switch LS1 or LS2 is turned on so that both low side switches LS1 and LS2 are on. Current through the windings L1 and L2 of the coupled inductor decreases and may reverse. As the current decreases, the controller 102 may turn on a different one of the high side switches HS2 or HS1 while turning off the corresponding low side switch LS2 or LS1. This builds current through the associated winding L2 or L1 of the coupled inductor. As the current builds, magnetic coupling produces current through the now un-driven winding L1 or L2 of the coupled inductor, and the associated low side switch LS1 or LS2 is turned on so that current through both windings L12 and L2 of the coupled inductor can charge the capacitor. This cycle repeats as the converter 100 operates in CCM.

Each low side switch LS1 and LS2 has a body diode. For high efficiency at low operating voltages, to avoid power dissipation in the body diodes, the low side switches LS1 and LS2 are turned on. The output voltage Vout is controlled by varying a duration for which each high side switch HS1 and HS2 is held on to maintain a suitable output voltage. The output voltage Vout can be controlled using voltage mode control, current mode control, or any other control method.

In DCM operation, the controller 102 monitors the output voltage Vout. When Vout drops below a threshold Vth, an energy delivery pulse begins. During a first energy delivery pulse, the high side switch HS1 is turned on, and the low-side switch LS2 for an inductively coupled opposite phase is turned on. As current builds in the winding L1 associated with the high side switch HS1, a similar current is induced in the winding L2 associated with the low side switch LS2. After the high-side switch HS1 has been on for a pulse width Tpw, the high side switch HS1 is turned off, and the corresponding low side switch LS1 is turned on. After current through the windings L1 and L2 of the coupled inductor decays to zero, the low side switches LS1 and LS2 are turned off. The cycle repeats as the controller 102 monitors Vout.

Throughout the present disclosure, in DCM, the terms strong coupling and weak coupling between the inductors of the coupled inductor are used to mean the following. In DCM, when a high side switch of a first phase is on and a low side switch of a second phase is off, the coupling between the inductors of the coupled inductor is strong if the body diode of the low side switch conducts and is weak if the body diode of the low side switch does not conduct.

FIGS. 3-5 show different ways of operating the converter 100 at light load in DCM. In FIG. 3, in DCM, the body diode of the low side switch LS2 is simply allowed to conduct. When the high side switch HS1 is turned on, the low side switch LS2 is kept off. In strong coupling case (high Lm/Lk ratio and low converter duty cycle), the voltage at the switching node LX2 of phase 2 can be less than the forward voltage drop of the body diode of the low side switch LS2. Consequently, the body diode of the low side switch LS2 will conduct and generate extra body diode conduction loss, which can drop converter efficiency by 5-20%.

In FIG. 4, in DCM, when the high side switch HS1 is turned on, the low side switch LS2 is also turned on; and when the high side switch HS2 is turned on, the low side switch LS1 is also turned on. When the high side switch HS1 is turned on, and the low side switch LS2 is also turned on, for strong coupling, inductor current IL2 flowing through phase 2 will have positive slope (direction as indicated by arrow); and for weak coupling, inductor current IL2 flowing through phase 2 will have negative slope (direction opposite of that indicated by arrow), which decreases converter efficiency. Similar result is obtained when the high side switch HS2 is turned on, and the low side switch LS1 is also turned on.

In FIG. 5, in DCM, the phases are switched on and off in parallel. For each phase, the equivalent inductance is equal to the leakage inductance, which is low. If the on-time of the switches is kept the same as in CCM, the peak inductor current in DCM will be very high due to the low leakage inductance, which increases ripple and decreases efficiency. If the on-time is reduced in DCM, the switching frequency will be high since small amount of energy will be delivered in each cycle.

The present disclosure eliminates the unwanted conduction of the body diode of the low side switch or the unwanted conduction of the low side switch in coupled phases of DC-DC converters operating in DCM to increase efficiency. Specifically, in one implementation, by detecting strong or weak coupling, the present disclosure eliminates body diode conduction in strong coupling by turning on the low side switch and eliminates negative body diode current in weak coupling by turning off the low side switch as explained below in detail.

The present disclosure proposes three classes of solutions to prevent conduction of the body diode of the low side switch: bypassing current around the body diode of the low side switch to reduce conduction losses when needed; blocking current from flowing through the body diode of the low side switch; and limiting voltage across the body diode of the low side switch to less than the forward voltage drop of the body diode. That is, for multiphase switching DC-DC converters with coupled inductors operating at light load (i.e., in DCM), when a high side switch of a first phase is turned on, the body diode of a low side switch of a second phase is adaptively bypassed if needed, blocked by specific design, or prevented from conducting by reducing forward voltage across the body diode.

While the present disclosure uses a two-phase DC-DC converter for example only, the teachings of the present disclosure can be extended to DC-DC converters comprising more than two phases. Further, throughout the present disclosure, while the operations are described in terms of how phase 2 is controlled when phase 1 is turned on for example only, phase 1 can be similarly controlled when phase 2 is turned on. Also, while NMOS switches are shown for example only, PMOS (or any other suitable switches) can be used instead, where polarities and directions of voltages and currents, and logic levels of signals shown and described below may be reversed accordingly. Further, while the proposed solutions focus on DCM and light load operations, the controllers and converters disclosed herein are designed to and can in fact operate in CCM and DCM over light, medium, and heavy load conditions.

FIG. 6 shows a controller 104 that controls the converter 100. The controller 104 detects whether coupling between the inductors of the coupled inductor is strong or weak, and bypasses a body diode of a low side switch of depending on the coupling strength of the coupled inductor. The controller 104 can detect the coupling strength of the coupled inductor in many ways. For example, the controller 104 can detect the coupling strength of the coupled inductor by sensing currents IL1 and IL2 through the inductors L1 and/or L2 of the coupled inductor; by sensing voltages at the switching nodes LX1 and/or LX2 of the phases of the converter 100; and so on.

For example, the controller 104 determines that the coupling is weak, if the body diode of the low side switch LS2 does not conduct when the low side switch LS2 is off and the high side switch HS1 is on. Alternatively, the controller 104 determines that the coupling is weak, if the voltage at the switching node LX2 of phase 2 is positive (for NMOS switches, or negative for PMOS switches) when the low side switch LS2 is off and the high side switch HS1 is on.

Conversely, the controller 104 determines that the coupling is strong, if the body diode of the low side switch LS2 conducts when the low side switch LS2 is off and the high side switch HS1 is on; or if the voltage at the switching node LX2 of phase 2 is negative (for NMOS switches, or positive for PMOS switches) when the low side switch LS2 is off and the high side switch HS1 is on. The threshold between strong and weak coupling may not be chosen exactly at the boundary of where the low side body diode would conduct if not prevented.

In DCM, when the high side switch HS1 is on, the controller 104 controls the low side switch LS2 based on the coupling strength of the coupled inductor as follows: the controller 104 turns on the low side switch LS2 if the coupling is strong to prevent body diode conduction, and the controller 104 does not turn on the low side switch LS2 if the coupling is weak to prevent negative current flow through the body diode. Thus, by turning the low side switch LS2 on and off when the coupling strength of the coupled inductor is strong and weak eliminates any current flow through the body diode of the low side switch LS2 in DCM at light load. FIG. 7 shows that while the controller 102 of FIG. 1 turns on the low side switch LS2 when the coupling is weak, the controller 104 of FIG. 6 does not turn on the low side switch LS2 when the coupling is weak and bypasses the body diode of the low side switch LS2 when the coupling is weak.

In FIG. 1, for 2 coupled phases, when the high side switch HS1 of phase 1 is turned on, phase 2 stays in high impedance (both HS2 and LS2 are off). If coupling between two phases is strong, the switching node voltage LX2 of the coupling phase (phase 2) will be negative enough to forward bias the body diode of the low side switch LS2 of phase 2, and positive current will flow through leakage inductor of phase 2, causing extra power losses. In order to reduce losses due to the body diode conduction, the controller 102 turns on the low side switch LS2 when HS1 is turned on. If the coupling is weak, however, turning on the low side switch LS2 when HS1 is turned on can generate negative current flow though the body diode of the low side switch LS2.

In contrast, in FIG. 6, the controller 104 turns on the low side switch LS2 of phase 2 when the high side switch HS1 of phase 1 is turned on only if the coupling is strong. The controller 104 does not turn on the low side switch LS2 of phase 2 when the high side switch HS1 of phase 1 is turned on if the coupling is weak. Turning the low side switch LS2 on and off when the coupling strength of the coupled inductor is strong and weak, respectively, eliminates any current flow through the body diode of the low side switch LS2 in DCM at light load.

In low duty cycle applications, over the entire Vin/Vout operating range of the DC-DC converter, the coupling between the phases is strong enough; and in Skip mode, the low side switch LS2 of phase 2 is always turned on when the high side switch HS1 of phase 1 is turned on. Accordingly, if the coupling between the phases is strong, the controller 104 turns on the low side switch LS2 of phase 2 when the high side switch HS1 of phase 1 is turned on.

In handheld power applications, however, in the Vin/Vout range, the coupling between the phases can be strong or weak. If the coupling is strong, the controller 104 turns on the low side switch LS2 of phase 2 when the high side switch HS1 of phase 1 is turned on. If the coupling is weak, the controller 104 does not turn on the low side switch LS2 of phase 2 when the high side switch HS1 of phase 1 is turned on.

Another method for bypassing the body diode includes using coupled inductors only in CCM. As soon as the converter enters DCM, the controller disables all phases with coupled inductor. Only phases with un-coupled inductor are used for DCM. The controller many enable or disable the un-coupled phases in CCM mode.

FIG. 8 shows an example of a DC-DC converter 200 and a controller 202 where the body diode conduction in DCM is prevented (as shown in FIG. 9) using different blocking techniques. Using these blocking techniques, even when the voltage across the low side switch LS2 of the converter 202 is greater than the body diode forward voltage, the body diode of the low side switch LS2 will not turn on. As explained below in detail with reference to FIGS. 10-16, the body diode conduction in a low side switch can be prevented in DCM using the following techniques, which increase the body diode conducting threshold for the low side switch: using a low side switch comprising back-to-back series connected switches, switching bulk connections of the low side switch, using a low side switch comprising a plurality of series-connected switches, or biasing the bulk of the low side switch to a more negative voltage (if NMOS switches are used, or more positive voltage if PMOS switches are used).

Using these techniques, when the coupling is strong, the switching node voltage LX2 of phase 2 can be negative, and the diode forward voltage can be below ground (GND). When the coupling is weak, the body diode is automatically prevented from conducting as follows. Accordingly, no control logic or circuits are needed to determine whether coupling is weak or strong.

FIG. 10 shows an example of a DC-DC converter 200-1 and a controller 202-1 where the body diode conduction is prevented in DCM using a low side switch comprising back-to-back series connected switches. For example, in each phase, the low side switch comprises first and second back-to-back series connected switches, where the first switch is connected to the switching node (LX1 or LX2) and to the second switch, and the second switch is connected to the first switch and ground as shown. The controller 202-1 generates the control signals HS1, LS1$b$, LS1, HS2, LS2$b$, and LS2 that drive the switches in phases 1 and 2 as shown in FIG. 11.

Each phase includes a level shifter and driver, and a low voltage selector that are connected to the first switch of the low side switch of each phase as shown. The operation of these components is described below (and shown in FIG. 11) using phase 2 as an example. Similar explanation obtains for phase 1 when phase 2 is on and phase 1 is off. Other components or logic with similar functionality may be used instead of these components to prevent body diode conduction as described below.

In phase 2, the level shifter and driver drives the first switch of the low side switch by converting a signal LS2$b$ (from the controller 202-1) from a VDD-GND supply rail to a VDD-PL2 supply rail. PL2 is equal to the lower of the switching node voltage LX2 or GND. The low voltage selector automatically connects PL2 output by the level shifter and driver to the lower of the switching node voltage LX2 or GND as shown. The second switch of the low side switch is driven by the signal LS2 from the controller 202-1 as shown in FIG. 11.

In CCM and non-Skip DCM operation, the signal LS2$b$ is always high (the low side cascade switch is kept on). In light load Skip mode operation, where inductor current of each phase is not overlapped (e.g., in FIG. 11, HS2 turns on after LS1 turns off at IL1 zero crossing), LS2$b$ is low only when HS1 is high. Accordingly, unlike FIG. 6, no control logic or circuits are needed to determine whether coupling is weak or strong, and body diode conduction is prevented regardless of coupling strength.

FIG. 12 shows an example of a DC-DC converter 200-2 and a controller 202-2 where the body diode conduction is prevented in DCM by switching bulk connections of the low side switches. The structural arrangement for switching bulk connections of the low side switches is the same in each phase; therefore, the structural arrangement for switching bulk connections of the low side switch of only phase 2 is described.

In phase 2, the low side switch LS2 comprises a first switch S2$a$ connected to the drain (and the switching node LX2) and to the bulk of the low side switch; and a second switch S2$b$ connected to the bulk and to the source of the low side switch (i.e., to ground) as shown. The controller 202-2 generates the control signals HS1, LS1, BS1$a$, BS1$b$, HS2, LS2, BS2$a$, and BS2$b$ that drive the switches in phases 1 and 2 as shown in FIG. 13.

In addition to the switches for switching bulk connections of the low side switches, each phase includes a level shifter and driver, and a low voltage selector that are connected to the low side switch of each phase as shown. The operation of these components is described below (and shown in FIG. 13) using phase 2 as an example. Similar explanation obtains for phase 1 when phase 2 is on and phase 1 is off. Other components or logic with similar functionality may be used instead of these components to prevent body diode conduction as described below.

In phase 2, the level shifter and driver drives the low side switch by converting a signal LS2 (from the controller 202-2) from a VDD-GND supply rail to a VDD-PL2 supply rail. PL2 is equal to the lower of the switching node voltage LX2 or GND. The low voltage selector automatically connects PL2 output by the level shifter and driver to the lower of the switching node voltage LX2 or GND as shown. The controller 202-2 generates bulk switching control signals BS2a and BS2b to operate the switches S2a and S2b as shown in FIG. 13.

In CCM and non-Skip DCM operation, BS2a is low, BS2b is high, S2a is off, and S2b conducts (bulk and source are shorted together). In Skip mode operation, when HS1 is high, states of BS2a and BS2b are determined by the voltage level at the switching node LX2. If LX2>=0, BS2a is low, BS2b is high, and S2b conducts, shorting bulk and source together. If LX2<0, BS2a is high, BS2b is low, and S2a conducts, shorting bulk and drain together. Accordingly, unlike FIG. 6, no control logic or circuits are needed to determine whether coupling is weak or strong, and body diode conduction is prevented regardless of coupling strength.

FIG. 14 shows an example of a DC-DC converter 200-3 and a controller 202-3 where the body diode conduction is prevented in DCM using a low side switch comprising a plurality of series-connected switches. For example, the low side switch in each phase comprises at least first and second series connected switches, where the first switch is connected to the switching node (LX1 or LX2) and to the second switch, and the second switch is connected to the first switch and ground as shown. The controller 202-3 generates the control signals HS1, LS1, HS2, and LS2 that drive the switches in phases 1 and 2.

In each phase, a first level shifter and driver is connected to the first switch of the low side switch; a second level shifter and driver is connected to the second switch of the low side switch; and so on as shown. The inputs of the first level shifter and driver, the second level shifter and driver, and so on are tied together and are driven by the switching signal LS1 or LS2 from the controller 202-3 as shown.

Using a plurality of series-connected switches in the low side switch increases the threshold voltage for body diode conduction in the low side switch and prevents body diode conduction in the low side switch. For example, the switching node voltage LX2 can be negative N times forward voltage drop of a body diode of a series connected switch in a low side switch, where N is an integer greater than 1 and denotes the number of series-connected switches in the low side switch. Accordingly, unlike FIG. 6, no control logic or circuits are needed to determine whether coupling is weak or strong, and body diode conduction is prevented regardless of coupling strength.

FIG. 15 shows an example of a DC-DC converter 200-4 and a controller 202-4 where the body diode conduction is prevented in DCM by biasing the bulk of the low side switches to a more negative voltage (if NMOS switches are used, or a more positive voltage if PMOS switches are used). The structural arrangement for biasing the bulk of the low side switches is the same in each phase; therefore, the structural arrangement for biasing the bulk of the low side switch of only phase 2 is described.

In phase 2, the low side switch LS2 comprises a first switch S2a connected to the bulk and to the source of the low side switch (i.e., to ground) as shown; and a second switch S2b connected to the bulk of the low side switch and a negative voltage supply (if NMOS switches are used; or a positive voltage supply if PMOS switches are used). The controller 202-4 generates the control signals HS1, LS1, BS1a, BS1b, HS2, LS2, BS2a, and BS2b that drive the switches in phases 1 and 2 as shown in FIG. 16.

In addition to the switches for biasing the bulk of the low side switches, each phase includes a level shifter and driver, and a low voltage selector that are connected to the low side switch of each phase as shown. The operation of these components is described below (and shown in FIG. 16) using phase 2 as an example. Similar explanation obtains for phase 1 when phase 2 is on and phase 1 is off. Other components or logic with similar functionality may be used instead of these components to prevent body diode conduction as described below.

In phase 2, the level shifter and driver drives the low side switch by converting a signal LS2 (from the controller 202-4) from a VDD-GND supply rail to a VDD-PL2 supply rail. PL2 is equal to the lower of the switching node voltage LX2 or GND. The low voltage selector automatically connects PL2 output by the level shifter and driver to the lower of the switching node voltage LX2 or GND as shown. The controller 202-4 generates control signals BS2a and BS2b to operate the switches S2a and S2b as shown in FIG. 16.

When NMOS switches are used, Vneg is a negative voltage generated by the DC-DC converter 200-4 that is more negative than the lowest voltage at the switching node LX2 can be. Thus, when the bulk of the low side switch is connected to Vneg through S2b, both body diodes of the low side switch cannot conduct.

In CCM and non-Skip DCM operation, BS2a is high, BS2b is low, S2a is on, and S2b is off (i.e., bulk and source of the low side switch are shorted together). In Skip mode operation, when HS1 is high, BS2a is low, BS2b is high, S2a is off, and S2b is on (i.e., bulk of the low side switch is connected to the negative bias voltage Vneg). Accordingly, unlike FIG. 6, no control logic or circuits are needed to determine whether coupling is weak or strong, and body diode conduction is prevented regardless of coupling strength.

Another method of preventing negative voltage (if NMOS switches are used, or positive voltage if PMOS switches are used) at the switching nodes to prevent body diode conduction involves adjusting coupling between phases. The coupling inductor can be designed to have more mutual coupling between active phases in DCM. The coupling inductor can be designed to reduce the coupling voltage across the body diode of the low side switch to less than the forward voltage drop of the body diode to prevent body diode conduction.

FIGS. 17 and 18 show an example of a DC-DC converter 300 and a controller 302 where the body diode conduction is prevented in DCM using modified coupled inductor topologies and/or connections. Examples of modified coupled inductor topologies and/or connections are shown and described referring to FIGS. 19 and 20 below. The modified coupled inductor topologies and/or connections are used to prevent voltage across a turned off low side switch from being greater than a forward voltage drop of the body diode of the turned off low side switch.

FIGS. 19 and 20 show examples of the modified coupled inductor topologies and/or connections. These modified coupled inductor topologies and/or connections can prevent body diode conduction in DCM. The modified coupled inductor topologies and/or connections can provide different types of couplings. For example, the different types of couplings can include selective coupling of phases, adjustment of coupling factor (weak/strong), multiphase coupling (coupling two or more phases), and asymmetric coupling of phases. The modified coupled inductor topologies and/or connections and the different types of couplings are described below.

In designing a coupled inductor, more coupling phase(s) can be added to certain phase(s); or magnetizing inductance and leakage inductance can be changed for certain phase(s); and these phase(s) can be used only during Skip mode. The switching node voltage of these specifically designed phase(s) will not go negative below (for NMOS switches, or positive above for PMOS switches) forward voltage drop of a low side switch body diode, and the low side switch body diode will not conduct.

In some implementations, coupled inductors (or coupled inductor together with an uncoupled inductor) can be used in CCM while the uncoupled inductor can be used in DCM only. Phase shedding may be implemented for phases with coupled inductor. For example, these operations, including selecting coupled inductors (or coupled inductor together with an uncoupled inductor) in CCM, selecting an uncoupled inductor in DCM only, and phase shedding, can be performed by the controller 302 shown in FIG. 18.

In an N phase converter (where N>3), coupled inductors can be designed to have asymmetrical coupling structure. For example, in a neighbor coupling case, each phase is coupled to neighboring two phases. To prevent body diode conduction at light load, phase A may be designed to couple to all other phases, and only phase A is used during light load operation. With more mutual coupling between phase A and other phases, when the high side switch of phase A turns on, the voltage across the low side switches of other phases can be greatly reduced to prevent conduction of the low side switch body diode.

The coupled inductor can be designed with specific magnetizing inductance (Lm) and leakage inductance (Lk) values. The magnetizing inductance (Lm) and leakage inductance (Lk) values can be selected for designated Vin/Vout operation range of the converter to ensure that the coupling voltage across the body diode of the low side switch is not high enough to conduct the body diode.

The inductances can be expressed in the form of a matrix (using linear algebra) called an inductance matrix that captures the details of every winding coupling relative to every other winding, and is a more general case that applies when there are more than two windings or when the coupling is not identical between phases. Magnetizing and leakage inductances are typically used to describe coupled inductors for two-phase applications. To fully describe an N-phase coupled inductor structure, an inductance matrix is commonly used. For N=2, the matrix is equivalent to the magnetizing and leakage inductance form.

One example of an inductance matrix is shown below.

L-Matrix Definition (defined in terms of a buck converter topology to facilitate subsequent discussion):

$$\begin{bmatrix} V_{LX1} - V_{OUT} \\ V_{LX2} - V_{OUT} \\ \vdots \\ V_{LXN} - V_{OUT} \end{bmatrix} = \begin{bmatrix} L_{11} & L_{12} & \cdots & L_{1N} \\ L_{21} & L_{22} & \cdots & L_{2N} \\ \vdots & \vdots & \ddots & \vdots \\ L_{N1} & L_{N2} & \cdots & L_{NN} \end{bmatrix} \begin{bmatrix} \frac{dI_1}{dt} \\ \frac{dI_2}{dt} \\ \vdots \\ \frac{dI_N}{dt} \end{bmatrix}$$

This is related to magnetizing ($L_M$) and leakage ($L_K$) for N=2 as follows:

$$L_{11} = L_{22} = L_M + L_K$$

$$L_{21} = L_{12} = -L_M$$

$$L_{Matrix} = \begin{bmatrix} L_{11} & L_{12} \\ L_{21} & L_{22} \end{bmatrix} = \begin{bmatrix} L_M + L_K & -L_M \\ -L_M & L_M + L_K \end{bmatrix}$$

For N=2, the following procedure can ensure that the voltage that is coupled across the body diode is less than a forward voltage drop of the body diode:

First, solve this system of equations for $V_{LX2}$ $$\begin{bmatrix} V_{IN} - V_{OUT} \\ V_{LX2} - V_{OUT} \end{bmatrix} = \begin{bmatrix} L_{11} & L_{12} \\ L_{21} & L_{22} \end{bmatrix} \begin{bmatrix} \frac{dI_1}{dt} \\ 0 \end{bmatrix}$$

$$V_{LX2} = \frac{L_{21}}{L_{11}} V_{IN} + \left(1 - \frac{L_{21}}{L_{11}}\right) V_{OUT} = -\frac{L_M}{L_M + L_K} V_{IN} + \frac{2L_M + L_K}{L_M + L_K} V_{OUT}$$

Second, choose $L_M$ and $L_K$ such that VLX2 does not turn on the body diode:

$$V_{LX2} > -|V_{diode}|$$

For generalized N-phase, the same procedure is followed. First, solve the system of equations for $V_{LX,i}$, where i is in the set of phases that is not driven by the high- or low-side switches. For example, assume phase 1 is driven and phases 2-N are not.

$$\begin{bmatrix} V_{IN} - V_{OUT} \\ V_{LX2} - V_{OUT} \\ \vdots \\ V_{LXN} - V_{OUT} \end{bmatrix} = \begin{bmatrix} L_{11} & L_{12} & \cdots & L_{1N} \\ L_{21} & L_{22} & \cdots & L_{2N} \\ \vdots & \vdots & \ddots & \vdots \\ L_{N1} & L_{N2} & \cdots & L_{NN} \end{bmatrix} \begin{bmatrix} \frac{dI_1}{dt} \\ 0 \\ \vdots \\ 0 \end{bmatrix}$$

Second, choose $L_{ik}$, where i=[1 to N] and k=[1 to N] such that $V_{LX,i}$, for i=[2 to N] is not less than the body diode voltage. This procedure can be followed for any combination of phases driven. The number of phases driven does not need to be 1.

In an N phase converter (N>2), the coupled inductor can be designed to have more phases coupling together, such as neighbor coupling (each phase coupling to neighboring two phases) or mutual coupling (each phase coupling to all other phases), which can reduce the coupling voltage across the low side switch and prevent the body diode of the low side switch from conducting. In addition, adding more phases in the converter and coupling the phases together can further decrease the coupling voltage across the low side switch and prevent the body diode of the low side switch from conducting at light load.

FIG. 21 shows a method 400 for preventing conduction of a body diode of a low side switch of a coupled-inductor DC-DC converter operating at light load in DCM by detecting strong or weak coupling. At 402, control determines if the converter is operating in DCM. At 404, if the converter is operating in DCM, control detects whether the coupling between inductors of the coupled inductor is strong or weak. At 408, if the coupling is strong, if high side switch of a first phase is on and low side switch of a second phase is off, turn on low side switch of the second phase; if low side switch of the second phase is on, keep it on. At 410, if the coupling is weak, if high side switch of a first phase is on and low side switch of a second phase is off, do not turn on low side switch of a second phase; If high side switch of a first phase is on and low side switch of a second phase is on, keep low side switch of the second phase on.

FIG. 22 shows a method 450 for preventing conduction of a body diode of a low side switch of a coupled-inductor DC-DC converter operating at light load in DCM by using a low side switch comprising back-to-back series connected switches. At 452, a low side switch in each phase of the converter comprises back-to-back series connected first and second switches. At 454, the first switch is connected to a switching node of the phase, and the second switch is connected to ground. At 456, control drives the first switch using a first signal and the second switch using a second signal.

At 458, control converters the first signal from a power supply level of the converter to a lower power level (e.g., from a VDD-GND supply rail to a VDD-PL2 supply rail, where PL2 is equal to the lower of the switching node voltage or GND). Further, control automatically connects level shifter output (PL2) to the switching node voltage or GND whichever is lower. At 460, in CCM and non-skip DCM operation, control holds the first signal always high. At 462, in light load skip mode operation, to prevent the low side switch body diode from conducting, control holds the first signal low only when a high side switch of a coupled phase is on.

FIG. 23 shows a method 500 for preventing conduction of a body diode of a low side switch of a coupled-inductor DC-DC converter operating at light load in DCM by switching bulk connections of the low side switch. At 502, in each phase, a first switch is connected across drain and bulk of a low side switch, and a second switch is connected across bulk and source of the low side switch. At 504, control drives the first switch using a first signal and the second switch using a second signal.

At 506, control converts a low side switching signal (e.g., LS2) from a power supply level of the converter to a lower power level (e.g., from a VDD-GND supply rail to a VDD-PL2 supply rail, where PL2 is equal to the lower of the switching node voltage or GND). Further, control automatically connects level shifter output (PL2) to the switching node voltage or GND whichever is lower.

At 508, in CCM and non-skip DCM operation, control turns the first switch off and the second switch on to short the bulk and source of the low side switch. At 510, in light load skip mode operation, when a high side switch of a first phase is on, to prevent the low side switch body diode of a second phase from conducting, control operates the first and second switches associated with the low side switch of the second phase depending on the switching node voltage as follows: control turns the first switch off and the second switch on to short the bulk and source of the low side switch in the second phase if the switching node voltage in the second phase is greater than or equal to 0; and control turns the first switch on and the second switch off to short the bulk and drain of the low side switch in the second phase if the switching node voltage in the second phase is less than 0.

FIG. 24 shows a method 550 for preventing a body diode of a low side switch from conducting at light load in a converter using a coupled inductor in DCM by using a low side switch comprising a plurality of series-connected switches. At 552, in each phase, a plurality of series connected switches (e.g., a first switch connected in series with a second switch) is arranged as a low side switch. At 554, control drives the plurality of series connected switches (e.g., the first switch and the second switch) using a LS switching signal. At 556, the switching node voltage in each phase can be negative N times the forward voltage drop of a body diode of a series connected switch in a low side switch, which increases the threshold voltage for body diode conduction in the low side switch and prevents body diode conduction in the low side switch.

FIG. 25 shows a method 600 for preventing conduction of a body diode of a low side switch of a coupled-inductor DC-DC converter operating at light load in DCM by biasing the bulk of the low side switch to a more negative voltage (if NMOS switches are used, or a more positive voltage if PMOS switches are used). At 602, in each phase of the converter, a first switch is connected across bulk and source of the low side switch, and a second switch is connected across the bulk of the low side switch and a voltage source. The voltage source supplies negative or positive voltage depending on whether the switches of the converter are NMOS and PMOS.

At 604, control drives the first switch using a first signal and the second switch using a second signal. At 606, control converts a low side switching signal (e.g., LS2) from a power supply level of the converter to a lower power level (e.g., from a VDD-GND supply rail to a VDD-PL2 supply rail, where PL2 is equal to the lower of the switching node voltage or GND). Further, control automatically connects level shifter output (PL2) to the switching node voltage or GND whichever is lower.

At 608, in CCM and non-skip DCM operation, control turns the first switch on and the second switch off to short the bulk and source of the low side switch. At 610, in light load skip mode operation, when a high side switch of a first phase is on, to prevent the low side switch body diode in the second phase from conducting, control turns the first switch off and the second switch on to connect the bulk of the low side switch to the voltage source in the second phase.

The teachings of the present disclosure described with reference to low-side switch body diodes can also be applied to high-side switch body diodes. Further, while in some applications, the converters described may operate in a voltage range where the high-side body diode never conducts, there are other applications where the high-side body diode would conduct. The teachings of the present disclosure are also equally applicable to multi-level converters having more than 2 switches per phase.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" or the term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A multiphase DC-DC converter comprising:
   a coupled inductor that includes first and second inductors coupled together;
   a first phase including first high side and low side switches connected to the first inductor;
   a second phase including second high side and low side switches connected to the second inductor; and
   a controller that
      drives the first and second high side switches and the first and second low side switches to operate the multiphase DC-DC converter; and
      in response to operating the multiphase DC-DC converter in discontinuous conduction mode and in response to the first high side switch being turned on, prevents conduction of a body diode of the second low side switch by bypassing current around the second low side switch body diode, blocking current from flowing through the second low side switch body diode, or increasing threshold for conduction of the second low side switch body diode,
   wherein the controller prevents second low side switch body diode conduction, depending on a strength of coupling between the first inductor and the second inductor, and wherein the controller:
      determines, in response to the first high side switch being turned on and the second low side switch being turned off, that coupling between the first inductor and the second inductor is strong or weak, based on whether the body diode of the second low side switch will conduct if not prevented from conducting;
      prevents second low side switch body diode conduction in response to the first high side switch being turned on when the coupling is strong; and
      does not prevent second low side switch body diode conduction in response to the first high side switch being turned on when the coupling is weak.

2. The multiphase DC-DC converter of claim 1 wherein the controller determines that the coupling between the first inductor and the second inductor is strong or weak based on:
   currents through one or more of the first and second inductors of the coupled inductor; or
   currents through one or more of the first and second high side and/or low side switches; or
   voltages at one or more of a first node at which the first inductor is connected to the first high side and low side switches and a second node at which the second inductor is connected to the second high side and low side switches.

3. The multiphase DC-DC converter of claim 1 wherein the controller determines that the coupling between the first inductor and the second inductor is:
  weak, based on the body diode of the second low side switch not conducting when the first high side switch is turned on and when the second low side switch is turned off; and
  strong, based on the body diode of the second low side switch conducting when the first high side switch is turned on and when the second low side switch is turned off.

4. The multiphase DC-DC converter of claim 1 wherein the controller determines that the coupling between the first inductor and the second inductor is:
  weak, based on a voltage at a node at which the second inductor is connected to the second high side and low side switches not being clamped by the body diode of the second low side switch when the first high side switch is turned on and when the second low side switch is turned off; and
  strong, based on the voltage at the node being clamped by the body diode of the second low side switch when the first high side switch is turned on and when the second low side switch is turned off.

5. The multiphase DC-DC converter of claim 1 wherein the controller:
  turns on the second low side switch in response to the first high side switch being turned on when the coupling is strong, to prevent the body diode of the second low side switch from conducting; and
  does not turn on the second low side switch in response to the first high side switch being turned on when the coupling is weak, to prevent negative current flow through the second low side switch.

6. The multiphase DC-DC converter of claim 1 wherein the controller blocks current from flowing through the body diode in the event that a voltage across the second low side switch is greater than a forward voltage drop of the body diode.

7. A multiphase DC-DC converter comprising:
  a coupled inductor that includes first and second inductors coupled together;
  a first phase including first high side and low side switches connected to the first inductor;
  a second phase including second high side and low side switches connected to the second inductor;
  a controller that
    drives the first and second high side switches and the first and second low side switches to operate the multiphase DC-DC converter; and
    in response to operating the multiphase DC-DC converter in discontinuous conduction mode and in response to the first high side switch being turned on, prevents conduction of a body diode of the second low side switch by bypassing current around the second low side switch body diode, blocking current from flowing through the second low side switch body diode, or increasing threshold for conduction of the second low side switch body diode;
  a fifth switch connected between the first high side and low side switches, wherein body diodes of the fifth switch and the first low side switch are connected back-to-back; and
  a sixth switch connected between the second high side and low side switches, wherein body diodes of the sixth switch and the second low side switch are connected back-to-back,
  wherein the controller decreases a tendency for conduction of body diodes of the first and second low side switches by:
    turning off the sixth switch in response to the first high side switch being turned on; and
    turning off the fifth switch in response to the second high side switch being turned on,
    wherein the body diodes of the first and second low side switches do not conduct.

8. The multiphase DC-DC converter of claim 7 wherein in response to the controller operating the multiphase DC-DC converter in continuous conduction mode, the controller turns on the fifth and sixth switches.

9. The multiphase DC-DC converter of claim 7 wherein each of the first and second phases includes a level shifter that converts a first control signal from the controller from a first supply rail to a second supply rail comprising a voltage lower than a switching node voltage and that outputs a second control signal to drive the fifth or sixth switches, wherein the body diodes of the first and second low side switches do not conduct irrespective of strength of coupling between the first inductor and the second inductor.

10. The multiphase DC-DC converter of claim 9 wherein in response to the controller operating the multiphase DC-DC converter in skip mode where the second low side switch is turned on when the first high side switch is turned on and where inductor currents of the first and second phases do not overlap, the first control signal and a third control signal that drives the first high side switch are of opposite polarities.

11. A multiphase DC-DC converter comprising:
  a coupled inductor that includes first and second inductors coupled together;
  a first phase including first high side and low side switches connected to the first inductor;
  a second phase including second high side and low side switches connected to the second inductor;
  a controller that
    drives the first and second high side switches and the first and second low side switches to operate the multiphase DC-DC converter; and
    in response to operating the multiphase DC-DC converter in discontinuous conduction mode and in response to the first high side switch being turned on, prevents conduction of a body diode of the second low side switch by bypassing current around the second low side switch body diode, blocking current from flowing through the second low side switch body diode, or increasing threshold for conduction of the second low side switch body diode;
  a fifth switch connected across bulk and drain terminals of the second low side switch; and
  a sixth switch connected across bulk and source terminals of the second low side switch,
  wherein the controller decreases a tendency for conduction of the body diodes of the second low side switch by:
    turning on the sixth switch in response to the first high side switch being turned on and a voltage at a junction of the second high side and low side switches having a first polarity; and
    turning on the fifth switch in response to the first high side switch being turned on and the voltage at the junction of the second high side and low side switches having a second polarity that is opposite to the first polarity, wherein the body diodes of the second low side switch do not conduct.

12. The multiphase DC-DC converter of claim 11 wherein each of the first and second phases includes a level shifter that converts a first control signal from the controller from a first supply rail to a second supply rail comprising a voltage lower than a switching node voltage and that outputs a second control signal to drive the first or second low side switch, wherein the body diodes of the first and second low side switches do not conduct irrespective of strength of coupling between the first inductor and the second inductor.

13. The multiphase DC-DC converter of claim 11 wherein in response to the controller operating the multiphase DC-DC converter in continuous conduction mode, the controller turns off the fifth switch and turns on the sixth switch.

14. The multiphase DC-DC converter of claim 11 wherein in response to the controller operating the multiphase DC-DC converter in skip mode where the second low side switch is turned on when the first high side switch is turned on, the fifth and sixth switches are turned on or off based on the voltage at the junction of the second high side and low side switches.

15. A multiphase DC-DC converter comprising:
a coupled inductor that includes first and second inductors coupled together;
a first phase including first high side and low side switches connected to the first inductor;
a second phase including second high side and low side switches connected to the second inductor; and
a controller that
drives the first and second high side switches and the first and second low side switches to operate the multiphase DC-DC converter; and
in response to operating the multiphase DC-DC converter in discontinuous conduction mode and in response to the first high side switch being turned on, prevents conduction of a body diode of the second low side switch by bypassing current around the second low side switch body diode, blocking current from flowing through the second low side switch body diode, or increasing threshold for conduction of the second low side switch body diode, wherein:
the first low side switch includes a first plurality of switches connected in series;
the second low side switch includes a second plurality of switches connected in series;
the controller decreases a tendency for conduction of body diodes of the first and second low side switches by controlling the first and second plurality of switches; and
the body diodes of the first and second low side switches do not conduct.

16. The multiphase DC-DC converter of claim 15 wherein the first and second plurality of switches decrease a tendency for conduction of the body diodes of the first and second low side switches and prevent conduction of the body diodes of first and second low side switches.

17. The multiphase DC-DC converter of claim 15 wherein if an integer N greater than 1 denotes a number of switches in each of the first and second plurality of switches, voltages at nodes at which the first and second high side switches are connected to the first and second low side switches are negative by N times a forward voltage drop of a body diode of a switch in the first and second plurality of switches to prevent conduction of the body diodes of first and second low side switches.

18. The multiphase DC-DC converter of claim 15 wherein each of the first and second phases includes a plurality of level shifters that convert a control signal from the controller from a first supply rail to a second supply rail comprising a voltage lower than a switching node voltage and that output a plurality of control signals to drive the first and second plurality of switches, wherein the body diodes of the first and second low side switches do not conduct irrespective of strength of coupling between the first inductor and the second inductor.

19. A multiphase DC-DC converter comprising:
a coupled inductor that includes first and second inductors coupled together;
a first phase including first high side and low side switches connected to the first inductor;
a second phase including second high side and low side switches connected to the second inductor;
a controller that
drives the first and second high side switches and the first and second low side switches to operate the multiphase DC-DC converter; and
in response to operating the multiphase DC-DC converter in discontinuous conduction mode and in response to the first high side switch being turned on, prevents conduction of a body diode of the second low side switch by bypassing current around the second low side switch body diode, blocking current from flowing through the second low side switch body diode, or increasing threshold for conduction of the second low side switch body diode;
a fifth switch connected across bulk and source terminals of the second low side switch; and
a sixth switch connected across bulk terminal of the second low side switch and a voltage source,
wherein the controller decreases a tendency for conduction of the body diode of the second low side switch by turning off the fifth switch and turning on the sixth switch in response to the first high side switch being turned on, and
wherein the body diode of the second low side switch does not conduct.

20. The multiphase DC-DC converter of claim 19 wherein the voltage source supplies a voltage of the same polarity as the type of a dopant used for the switches.

21. The multiphase DC-DC converter of claim 19 wherein in each of the first and second phases, in response to the switches using N type dopant, the voltage source supplies a negative voltage that is more negative than a lowest voltage at a switching node to prevent body diodes of the first and second low side switches from conducting.

22. The multiphase DC-DC converter of claim 19 wherein each of the first and second phases includes a level shifter that converts a first control signal from the controller from a first supply rail to a second supply rail comprising a voltage lower than a switching node voltage and that outputs a second control signal to drive the first or second low side switch, wherein body diodes of the first and second low side switches do not conduct irrespective of strength of coupling between the first inductor and the second inductor.

23. The multiphase DC-DC converter of claim 19 wherein in response to the controller operating the multiphase DC-DC converter in continuous conduction mode, the controller turns on the fifth switch and turns off the sixth switch.

24. The multiphase DC-DC converter of claim 19 wherein in response to the controller operating the multiphase DC-DC converter in skip mode where the second low side switch is turned on when the first high side switch is turned on, the controller turns off the fifth switch and turns on the sixth switch.

25. A multiphase DC-DC converter comprising:
  a coupled inductor that includes first and second inductors coupled together;
  a first phase including first high side and low side switches connected to the first inductor;
  a second phase including second high side and low side switches connected to the second inductor; and
  a controller that
    drives the first and second high side switches and the first and second low side switches to operate the multiphase DC-DC converter; and
    in response to operating the multiphase DC-DC converter in discontinuous conduction mode and in response to the first high side switch being turned on, prevents conduction of a body diode of the second low side switch by bypassing current around the second low side switch body diode, blocking current from flowing through the second low side switch body diode, or increasing threshold for conduction of the second low side switch body diode,
  wherein an inductance matrix of the coupled inductor ensures that a coupling voltage across the body diode is less than a forward voltage drop of the body diode, and wherein the inductance matrix includes a type of coupling between the first and second inductors, the type of coupling including selective coupling of phases, adjustment of coupling factor, multiphase coupling, and asymmetric coupling of phases.

* * * * *

UNITED STATES PATENT AND TRADEMARK OFFICE
CERTIFICATE OF CORRECTION

PATENT NO. : 9,966,853 B2
APPLICATION NO. : 15/283915
DATED : May 8, 2018
INVENTOR(S) : Xin Zhou et al.

It is certified that error appears in the above-identified patent and that said Letters Patent is hereby corrected as shown below:

On the Title Page

Item [*]   Delete "days. days." and insert -- days. --

In the Drawings

Drawing Sheet 17 of 20,
Reference Numeral 162;
Fig. 22   Delete "162" and insert -- 462 --

In the Specification

Column 2, Line 18   After "weak", insert -- : --
Column 12, Line 19   Delete "Lm." and insert -- $L_m$. --
Column 12, Line 21   Delete "Lk." and insert -- $L_k$. --
Column 12, Line 50   Delete "L12" and insert -- $L_1$ --
Column 13, Line 21   Delete "Lm/Lk" and insert -- $L_m/L_k$ --
Column 15, Line 52   Delete "202" and insert -- 200 --
Column 19, Line 37   Delete "(Lm)" and insert -- ($L_m$) --
Column 19, Line 37   Delete "(Lk)" and insert -- ($L_k$) --
Column 19, Line 38   Delete "(Lm)" and insert -- ($L_m$) --
Column 19, Line 39   Delete "(Lk)" and insert -- ($L_k$) --
Column 20, Line 24   Delete "VLX2" and insert -- $V_{LX2}$ --

Signed and Sealed this
Eighteenth Day of September, 2018

Andrei Iancu
*Director of the United States Patent and Trademark Office*